(12) United States Patent
Kjeldsen et al.

(10) Patent No.: US 7,206,359 B2
(45) Date of Patent: Apr. 17, 2007

(54) SYSTEM AND METHOD FOR ORTHOGONALLY MULTIPLEXED SIGNAL TRANSMISSION AND RECEPTION

(75) Inventors: Erik H. Kjeldsen, Marietta, GA (US); Alan R. Lindsey, 9850 Crowell Rd., Remsen, NY (US) 13438

(73) Assignees: Scientific Research Corporation, Atlanta, GA (US); Alan R. Lindsey, Remsen, NY (US)

( * ) Notice: Subject to any disclaimer, the term of this patent is extended or adjusted under 35 U.S.C. 154(b) by 758 days.

(21) Appl. No.: 10/400,834

(22) Filed: Mar. 27, 2003

(65) Prior Publication Data

US 2003/0231714 A1 Dec. 18, 2003

Related U.S. Application Data

(60) Provisional application No. 60/368,549, filed on Mar. 29, 2002.

(51) Int. Cl.
*H03K 9/00* (2006.01)
*H04L 27/00* (2006.01)
(52) U.S. Cl. .................................... 375/316; 375/295
(58) Field of Classification Search ................ 375/295, 375/296, 316, 146, 147
See application file for complete search history.

(56) References Cited

U.S. PATENT DOCUMENTS

| | | | |
|---|---|---|---|
| 5,367,516 A | 11/1994 | Miller | |
| 5,491,561 A * | 2/1996 | Fukuda | 386/123 |
| 5,995,539 A | 11/1999 | Miller | |
| 6,263,017 B1 | 7/2001 | Miller | |
| 6,581,081 B1 * | 6/2003 | Messerly et al. | 708/322 |
| 2001/0033612 A1 * | 10/2001 | Peeters | 375/222 |
| 2002/0181388 A1 | 12/2002 | Jain et al. | |
| 2002/0181617 A1 * | 12/2002 | Carleton | 375/316 |
| 2002/0196862 A1 | 12/2002 | Dill et al. | |

OTHER PUBLICATIONS

F. Daneshgaran, M. Mondin, and F. Dovis, "Symbol Synchronization for Multichannel Modulation," Proceedings of 32nd Conference on Information Science and Systems, Princeton, NJ, Mar. 1998.
A Dissertation Presented to The Faculty of the Russ College of Engineering and Technology, Ohio University, In Partial Fulfillment of the Requirements for the Degree Doctor of Philosophy entitled Generalized Orthogonally Multiplexed Communication via Wavelet Packet Bases by Alan R. Lindsey (Jun. 9, 1995), pp. 1-109.

(Continued)

*Primary Examiner*—Chieh M. Fan
*Assistant Examiner*—Jason M. Perilla
(74) *Attorney, Agent, or Firm*—Brenda O. Holmes; Kilpatrick Stockton LLP

(57) ABSTRACT

A wireless communication network that implements Circular Simplex Turbo Block Coded Modulation ("CSTBCM") Forward Error Correction ("FEC"), randomization and Wavelet Packet Modulation ("WPM") is provided. The network includes a transmitter that uses an adaptive tree structure. The tree structure is pruned to avoid known signal impediments by first determining the best uniform level and then tuning in the forward direction and in the reverse direction. The network also includes a receiver that implements a maximum likelihood decision directed ("MLDD") synchronization scheme. The synchronization scheme is pulse shape independent and non-data aided.

37 Claims, 21 Drawing Sheets

OTHER PUBLICATIONS

A.J. Rustako, L.J. Greenstein, R.S. Roman and A.A.M. Saleh, "Using times-four carrier recovery in M-QAM digital radio receivers," *IEEE Journal on Selected Areas in Communications*, vol. SAC-5, No. 3, pp. 524-533, Apr. 1987.

F. Dovis, M. Mondin, and F. Daneshgaran, "The Modified Gaussian: A Novel Wavelet with Low Sidelobes with Applications to Digital Communications," *IEEE Transactions on Communications Letters*, vol. 2, No. 8, pp. 208-210, Aug. 1998.

F. Ungerboeck, "Trellis-Coded modulation with Redundant Signal Sets Part I: Introduction," *IEEE Communications Magazine*, vol. 25, No. 2, Feb. 1987, pp. 5-11.

Lindsey, Alan R., "Improved Spread-Spectrum Communication with a Wavelet Packet Based Transreceiver," *Proceedings of International Symposium on Time-Frequency and Time-Scale Analysis '96*, pp. 417-420 (1996).

Medley, et al., "Applications of the wavelet transform in spread spectrum communications systems," *Proceedings of the SPIE-Wavelet Applications*, vol. 2242, pp. 54-68, Apr. 1994.

Sabel, Lesley Phillip, "A Maximum Likelihood Approach to Symbol Timing Recovery in Digital Communications," Ph.D. Dissertation, University of South Australia, The Levesl, South Australia, pp. 1-236 (Oct. 1993).

A Dissertation Presented to The Faculty of the Russ College of Engineering and Technology, Ohio University, In Partial Fulfillment of the Requirements for the Degree Doctor of Philosophy entitled "A Unified Approach to Orthogonally Multiplexed Communication Using Wavelet Bases and Digital Filter Banks," by William Wayne Jones (Aug. 1994), pp. 1-139.

\* cited by examiner

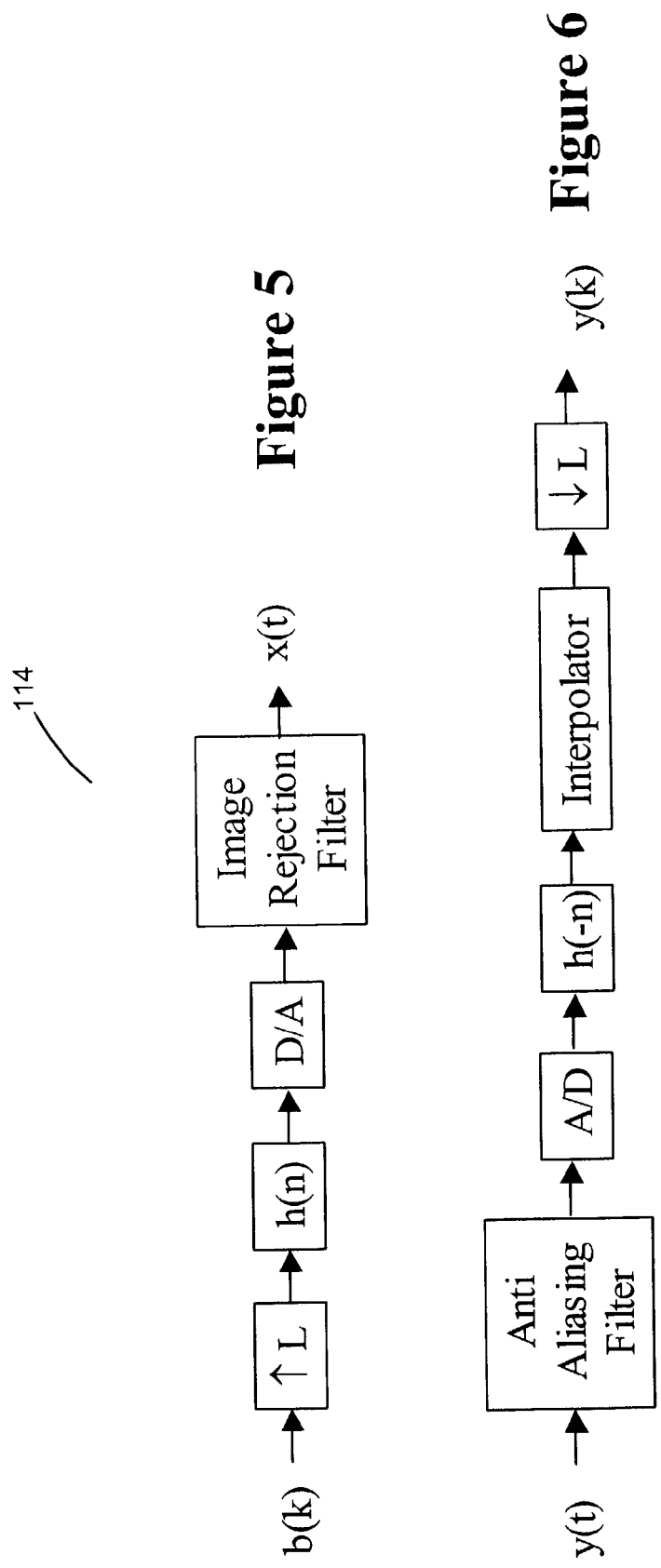

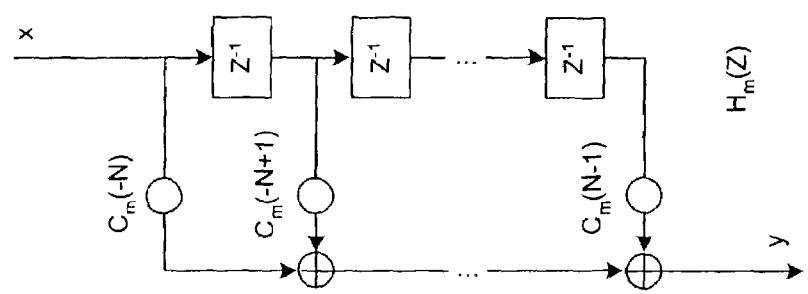
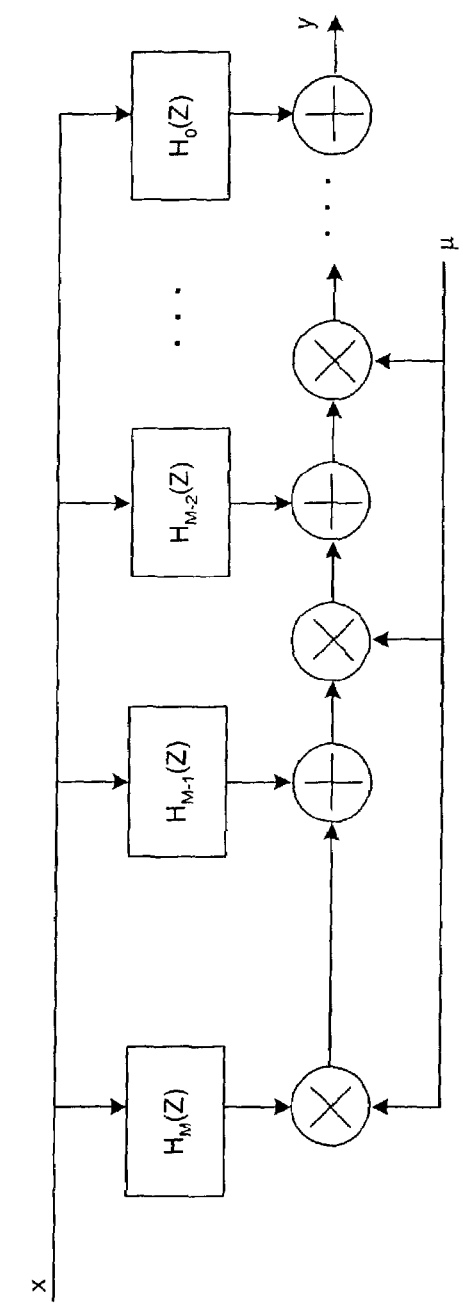
Fig. 13

SYSTEM AND METHOD FOR ORTHOGONALLY MULTIPLEXED SIGNAL TRANSMISSION AND RECEPTION

RELATED APPLICATION

This application claims priority to U.S. Provisional Patent Application No. 60/368,549 entitled "System and Method for Orthogonally Multiplexed Signal Transmission and Reception" filed Mar. 29, 2002, which is incorporated herein by reference.

GOVERNMENT CONTRACT REFERENCE

The U.S. Government has a paid-up license in this invention and the right in limited circumstances to require the patent owner to license others on reasonable terms as provided for by the terms of Army Contract No. DAAH01-01-C-R196 awarded by the DARPA Advanced Technology Office.

TECHNICAL FIELD

This invention relates in general to a wireless communication system, and more particularly to a wireless communication system that uses orthogonally multiplexed signal transmission and reception.

BACKGROUND

The volume of multimedia traffic (voice, video, image and data) being transmitted across networks, including wireless communication networks, is increasing. To accommodate the increased volume of multimedia traffic, higher throughput, increased reliability, and more efficient use of limited bandwidth is needed. However, wireless communication networks generally have lower bandwidths, harsher time-varying fading characteristics and higher error rates than wired networks. In addition, in some applications, such as military applications, wireless communication networks also need to protect against intentional interference and provide secure transmissions.

Multi-Carrier Modulation ("MCM") techniques have been used with wireless communication networks to address these needs. MCM divides a data stream into several parallel streams, each at a much lower bit rate, and then modulates these substreams onto their respective subcarriers (as opposed to the conventional single carrier system). MCM systems include Wavelet Packet Modulation ("WPM") systems. WPM combines multidimensional communications principles and wavelet principles into a multirate wavelet-based modulation format for orthogonally multiplexed communications. WPM minimizes the adverse effects of narrowband and time-impulsive interference by isolating the impact of such interference to the minimal number of atomic signal components. In other words, WPM allows a flexible, custom mapping of the desired signal on the communications channel at the transmitter to avoid a variety of known interference patterns.

In theory, it is possible to find an optimal WPM mapping for any narrowband/impulsive interference combination. However, the number of possible time-frequency mappings escalates rapidly with respect to the number of levels in the WPM filter bank structure. The number of members in the partition set (number of possible mappings) versus the number of filter bank levels proceeds as follows: one level—2 partitions; two levels—5 partitions; three levels—26 partitions; four levels—677 partitions; five levels—458,330 partitions; six levels—over 210 billion partitions; and so forth. This combinatoric explosion poses a challenge to real-time solution searches. Thus, there is a need for efficiently identifying a mapping to avoid detected noise/interference patterns.

One problem in using WPM in a wireless communication network is performing symbol synchronization at the receiver end. Multi-carrier modulation systems are particularly sensitive to symbol sampling time offsets because the spectral overlap of the subcarriers can cause significant adjacent channel interference ("ACI") when timing jitter is present. These systems use orthogonal filtering to divide the baseband data into orthogonal frequency subchannels. This process can be thought of as splitting the spectrum of a Nyquist pulse, resulting in subchannels that retain the Nyquist pulse shape (only the period is affected). The transitions between complex symbols that are modulated using conventional Fourier techniques are captured by edge detection techniques that exploit the shape and polarity of the received pulses to determine the optimal sampling instants. WPM produces different (dilated) pulse shapes on each subchannel (also referred to as "sub-band") such that the composite, orthogonally multiplexed signal lacks usable transitions. Inspection of the resultant signal constellation (i.e., eye pattern) after WPM reveals a nearly continuous footprint (i.e., closed eye). Thus, there is a need for providing symbol synchronization that does not rely on edge detection.

Channel coding has been used to improve the error handling performance of wireless networks. Circular Trellis Coded Modulation ("CTCM") is a channel coding technique that is based on principles of Trellis Coded Modulation ("TCM") and turbo coding. CTCM is also referred to as Circular Simplex Turbo Block Coded Modulation ("CSTBCM") and the terms CTCM and CSTBCM are used interchangeably herein. CSTBCM is a block-based error correction coding method that combines simplex signal mapping and a trellis butterfly structure in a clever way to form a circular tail-biting code. The decoding of CSTBCM can be performed using a circular variant of the decoding algorithm (Bahl Cocke Jelinek Raviv—BCJR) commonly used for turbo product codes ("TPC"). However, the shorter block sizes of CSTBCM provide a bit error rate performance competitive with TPC's large code blocks, approaching the Shannon limit but with considerably lower latency (up to 20-fold improvement). Thus, there also is a need for integrating CSTBCM into a system that uses WPM.

SUMMARY

The present invention meets the needs described above by providing a wireless communication network that implements Circular Simplex Turbo Block Coded Modulation ("CSTBCM") Forward Error Correction ("FEC"), randomization and Wavelet Packet Modulation ("WPM"). The network includes a transmitter that uses an adaptive tree structure. The tree structure is pruned to avoid known signal impediments by first determining the best uniform level and then tuning in the forward direction and in the reverse direction. The network also includes a receiver that implements a maximum likelihood decision directed ("MLDD") synchronization scheme. The synchronization scheme is pulse shape independent and non-data aided.

The network includes a transmitter and a receiver. The transmitter receives a binary input stream and maps the input into a symbol stream using a complex symbol mapper, such as a quadrature amplitude modulation ("QAM") symbol mapper. A demultiplexer divides the symbol stream into a number of parallel streams and an inverse discrete wavelet packet transform ("IDWPT") component outputs an orthogonal multiplexed complex symbol stream. A scaling function is applied to the orthogonal multiplexed complex symbol stream to shape the pulses of the stream.

To implement error correction, the transmitter includes a CSTBCM encoder and the receiver includes a CSTBCM decoder. The CSTBCM component is mapped onto the orthogonally multiplexed WPM symbols to counteract non-Gaussian interference sources and channel propagation anomalies. In addition, radomization or permutation can be used to provide additional protection from non-white noise. One example of permutation is interleaving.

Signal impediments, such as impulsive interference in the time domain and narrowband jamming in the frequency domain, are detected by a signal impediments component. Information about the detected signal impediments is provided to a supersymbol tuning component. The supersymbol tuning component can be associated with the transmitter or the receiver.

The receiver receives the transmitted signal and processes the signal. In particular, the receiver applies a scaling function matched to that used at the transmitter. In addition, the receiver includes a discrete wavelet packet transform ("DWPT") element that uses the same tree structure used in the IDPWT in the transmitter. The receiver also includes a symbol synchronization component. The symbol synchronization component uses an open-loop approach to correct for the time offset seen at the receiver, allowing the synchronizer to be implemented digitally. The key to symbol synchronization is estimating the modulation state transition points to determine the optimal sampling instant. The optimal sampling instant is the instant that mitigates intersymbol interference and captures the peak amplitude of a symbol.

The symbol synchronization component includes a matched filter that filters an orthogonally multiplexed, complex symbol stream to produce one that is free of intersymbol interference. The input of the matched filter is sampled using a sampling rate that is much greater than two times per pulse interval. A decimator selects one sample per symbol from the sampled matched filter output based on the timing estimate. Once the samples are selected, then the selected samples are input into a discrete wavelet packet transform ("DWPT") component which reduces the samples into component symbol streams. A multiplexer combines the component symbol streams into a serial complex symbol stream. The serial complex stream is fed into a symbol decision component (or symbol detector). The symbol decision component determines the most likely transmitted symbols. The output of the symbol decision component is the received data that is used by the system.

The received data is also input into a demultiplexer that divides the symbol stream into a number of parallel streams. Each parallel stream is fed into an inverse discrete wavelet packet transform ("IDWPT") component that outputs an orthogonal multiplexed, complex symbol stream. The IDWPT may account for any known non-uniformity in the channel impulse response by weighting the inputs to the component to introduce attenuation factors. The tree structure of the IDWPT is the same as that of the transmitter so that the information energy in the subchannels is maximized which helps minimize the jitter of the symbol timing estimator. The output of the IDWPT component is upsampled before being processed by a scaling function. The scaling function is applied to the orthogonal multiplexed, complex symbol stream to shape the pulse of the stream to a channel impulse response. The demultiplexer, IDWPT, and scaling function are equivalent to those used for transmitting.

The sampled matched filter output also is fed into a delay block. The delay block compensates for the fixed latency of the processing chain that consists of the DWPT, multiplexer, symbol decision component, demultiplexer, IDWPT, upsampler, and scaling function. The delayed output is correlated to the output of the scaling function component in the MLDD correlator using the timing estimator. A sliding correlator is used to conduct a search for the ML timing parameter, using trial time shift values that correspond to receiver sample clock increments. The observation window size of the sliding correlator can be set to a variable number of WPM pulses. The correlation output value will be greatest when the window is optimally aligned between the matched filter output sample stream and the reconstituted transmit signal. Once the timing estimate is determined, this value is fed into the interpolator/decimator block and is used to determine the optimal sampling instant. The timing estimate indicates which samples of the incoming signal stream correspond to the most interference-free symbol values. The decimator function keeps these samples for output symbol detection and discards the rest.

BRIEF DESCRIPTION OF THE DRAWINGS

FIG. 5 is a block diagram of a pulse shaper used in a transmitter in accordance with an embodiment of the invention.

FIG. 6 is a block diagram illustrating signal processing in a receiver in accordance with an embodiment of the invention.

FIG. 13 is a block diagram of an interpolator in accordance with an embodiment of the invention.

DETAILED DESCRIPTION

The present invention is directed to a wireless communication network that implements Circular Simplex Turbo Block Coded Modulation ("CSTBCM") and Wavelet Packet Modulation ("WPM"). CSTBCM is also referred to as Circular Trellis Coded Modulation ("CTCM") and the two terms are used interchangeable herein. Briefly described, the network includes a transmitter that uses an adaptive tree structure. The tree structure is pruned to avoid known signal impediments by first determining the best uniform level and then tuning in the forward direction and in the reverse direction. The network also includes a receiver that implements a maximum likelihood decision directed ("MLDD") synchronization scheme. The synchronization scheme is pulse shape independent and non-data aided. The symbol synchronization scheme uses an open-loop approach to correct the time offset so that it can be implemented digitally.

The WPM waveform and the mapping and synchronization schemes can be implemented in software code so that they are suitable for "downloading" onto software-defined radios. In addition, the WPM waveform and the mapping and synchronization schemes are suitable for use in wireless local area networks ("WLANs"), such as networks implementing the IEEE 802.11 standard. With respect to the IEEE 802.11a, 802.11g, 802.16a, and other relevant emerging standards, the orthogonal frequency division multiplexing ("OFDM") baseband process can be replaced with a WPM baseband process that abides by the standard's spectral envelope constraints.

Wireless Communication System

Figure 1:
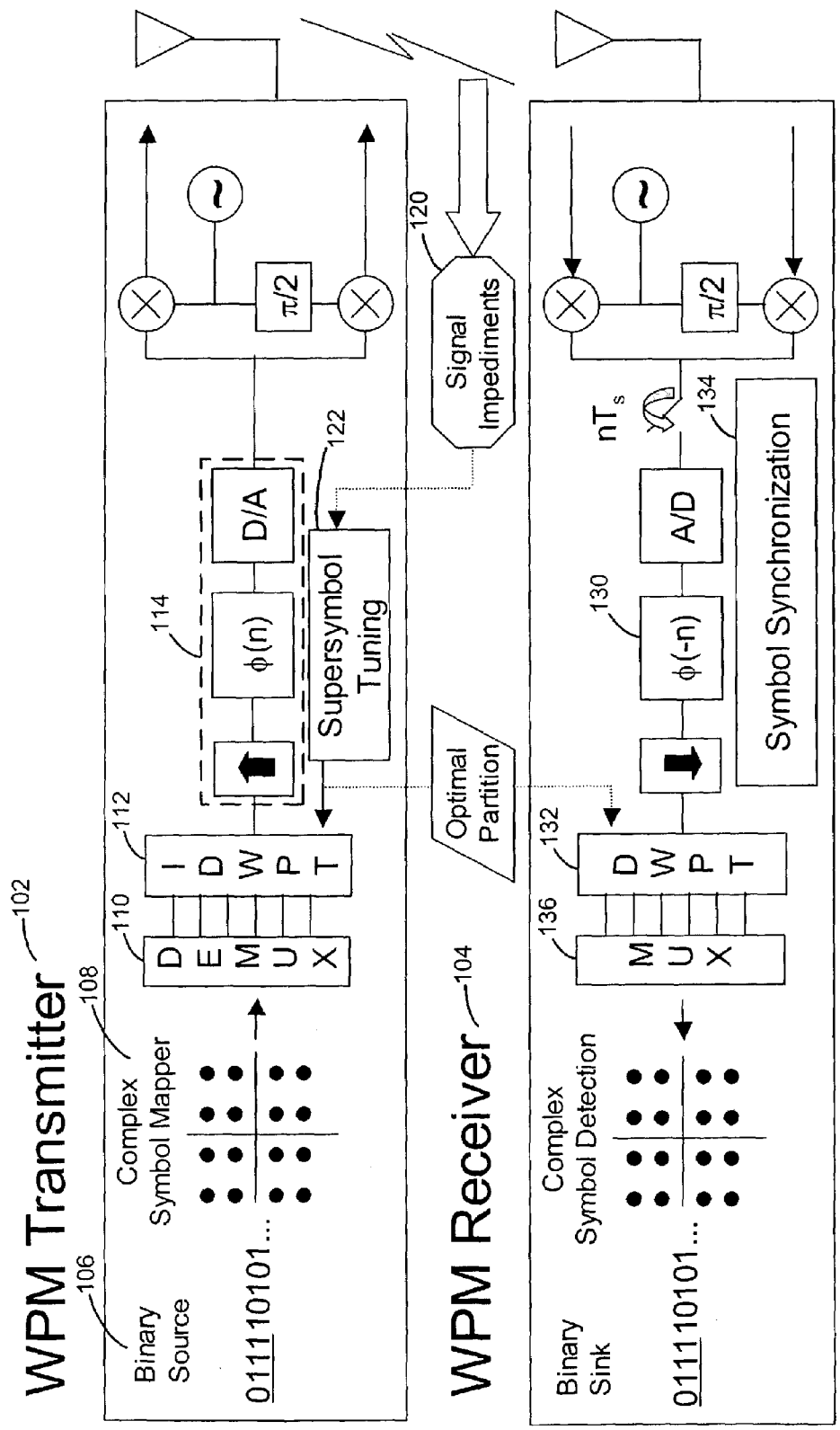
FIG. 1 is a block diagram of a transmitter and a receiver in accordance with an embodiment of the invention.

FIG. 1 illustrates a transmitter 102 and a receiver 104 for use in a wireless communication system in accordance with an embodiment of the invention. The transmitter receives a binary input stream 106 and maps the input into a symbol stream using a complex symbol mapper 108. In one embodiment the complex symbol mapper is a quadrature amplitude modulation ("QAM") symbol mapper. A demultiplexer 110 divides the symbol stream into a number of parallel streams and an inverse discrete wavelet packet transform ("IDWPT") component 112 outputs an orthogonal multiplexed complex symbol stream. A scaling function 114 is applied to the orthogonal multiplexed complex symbol stream to shape the pulses of the stream.

Signal impediments, such as impulsive interference in the time domain and narrowband jamming in the frequency domain, are detected by the signal impediments component 120. Information about the detected signal impediments is provided to the supersymbol tuning component 122. A supersymbol is a non-redundant partition of the time-frequency plane, whose individual time-frequency atoms convey symbol elements. The supersymbol tuning component determines an optimal partition based on the signal impediment information and prunes the filter bank in the IDPWT accordingly.

In one embodiment, the supersymbol tuning component is associated with the transmitter. The transmitter determines the signal impediments and communicates the optimal partition to the receiver. In another embodiment, the supersymbol tuning component is associated with the receiver. The receiver determines the signal impediments and communicates the optimal partition to the transmitter. In yet another set of embodiments, the signal impediments are determined externally and information regarding the signal impediments is communicated to the transmitter or receiver for supersymbol tuning to determine the optimal partition. The determination of the optimal partition is described in more detail in the section entitled "Supersymbol Tuning." The receiver receives the transmitted signal and processes the signal. In particular, the receiver applies a scaling function 130 matched to that used at the transmitter. In addition, the receiver includes a discrete wavelet packet transform ("DWPT") element 132 that uses the same tree structure used in the IDPWT in the transmitter.

The receiver also includes a symbol synchronization component 134. The symbol synchronization component uses an open-loop approach to correct for the time offset seen at the receiver, allowing the synchronizer to be implemented digitally. Details of symbol synchronization are provided in the section entitled "Symbol Synchronization."

Transmitter

The input source bits 106 are preferably mapped to a M-QAM complex symbol constellation, whose order "M" is one of the following: 16, 32, 64, or 256. In another embodiment, the input source bits are mapped to a Quadrature Phase Shift Keying ("QPSK") complex symbol constellation. In another embodiment, the input source bits are mapped to Binary Phase Shift Keying ("BPSK") real symbols.

Figure 2:
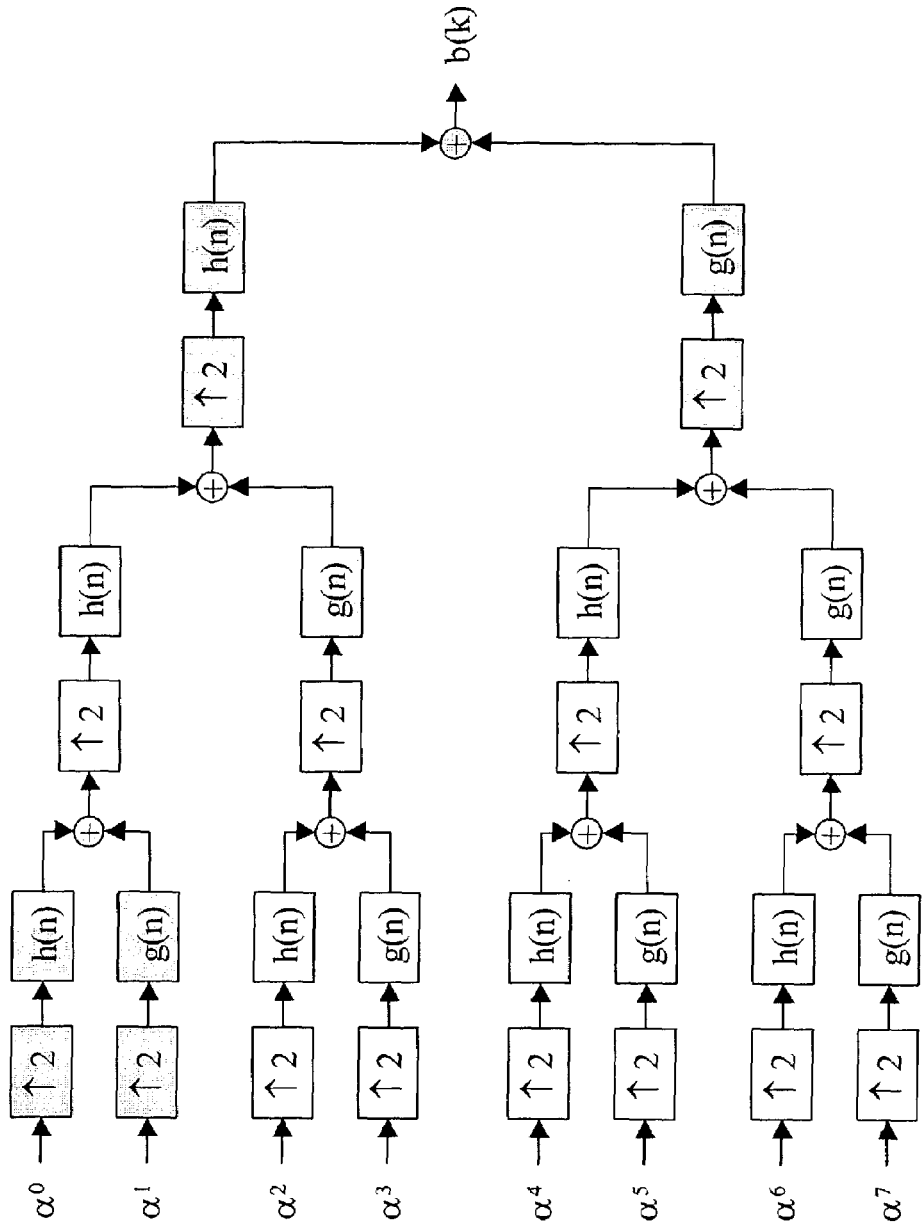
FIG. 2 is a block diagram of a uniform filter bank used in a transmitter in accordance with an embodiment of the invention.

The mapped symbol stream is demultiplexed into J parallel channels at appropriate rates. The substreams $\alpha^0$, $\alpha^1 \ldots \alpha^{J-1}$ are applied to the synthesis process of the IDWPT. FIG. 2 shows a uniformly structured, three-level, binary filter bank tree for IDWPT processing. Because this a uniform filter bank IDWPT with no pruned nodes, the input symbol period T for each of the substreams $\alpha^0$, $\alpha^1 \ldots \alpha^7$ is elongated to 8T. The symbol period stretching works similarly to OFDM for combating frequency-selective fading. Shaded blocks in FIG. 2 indicate the retained tree structure elements for an Inverse Discrete Wavelet Transform ("IDWT")—a subset of the IDWPT that is based on dyadic expansion. The $N^{th}$ level of the IDWPT filter bank tree is composed of between 1 and $2^N$ input nodes depending on the pruning selection. Each of these input nodes is upsampled by a factor two (i.e., a zero is inserted after every input value, doubling the data rate). Following the upsampling process, the signal is processed by one channel of a conjugate mirror filter ("CMF") pair. Another nomenclature used in the art is a quadrature mirror filter ("QMF") pair. The CMF pair consists of a lowpass, Finite Impulse Response ("FIR") filter denoted "h(n)" and a highpass, FIR filter denoted "g(n)".

Figure 3:
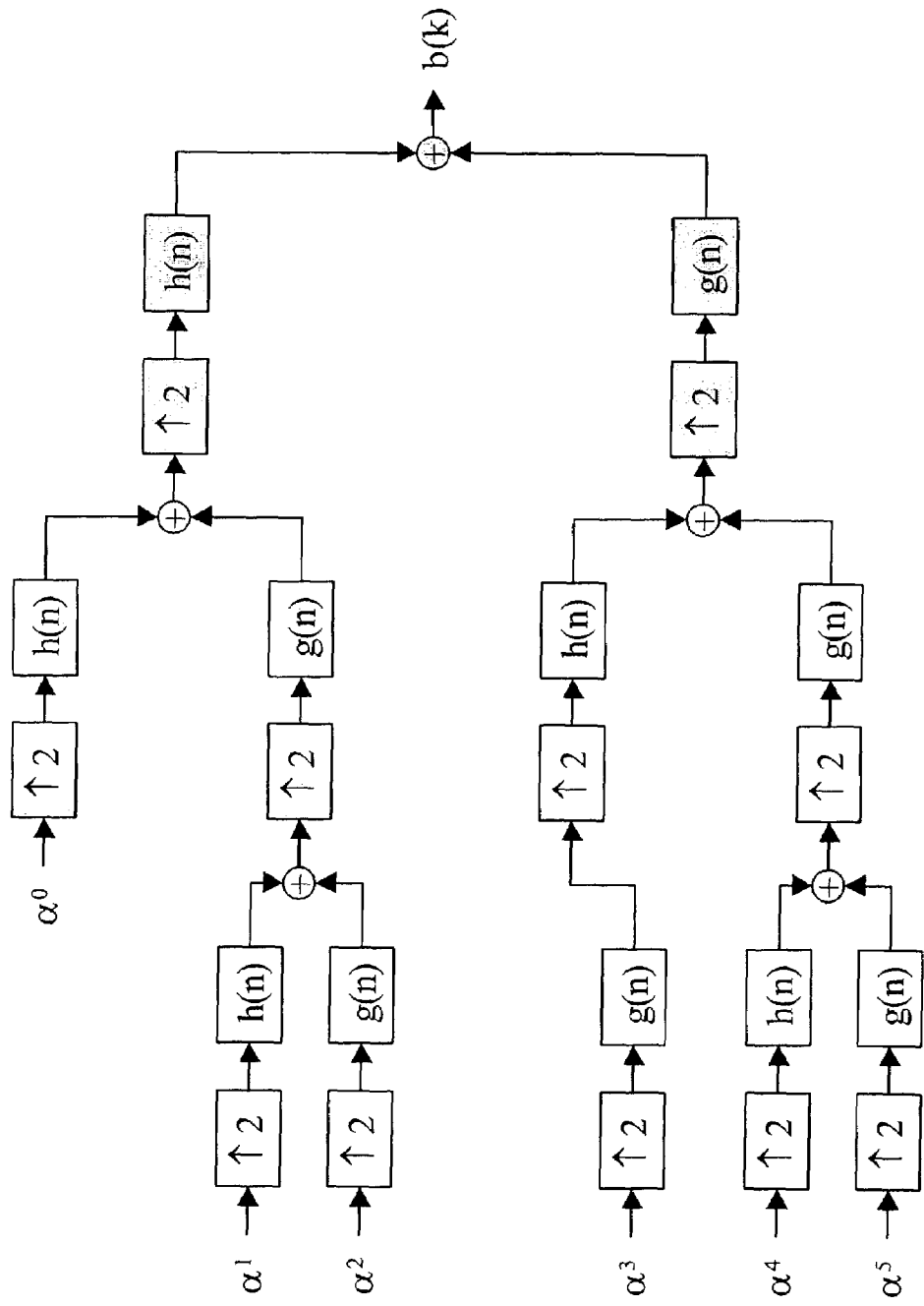
FIG. 3 is a block diagram of a non-uniform filter bank used in a transmitter in accordance with an embodiment of the invention.

FIG. 3 shows another embodiment of the IDWPT filter bank tree that is not uniform. For this pruned tree structure, the input symbol periods for the substreams are 4T for $\alpha^0$ and 8T for $\alpha^1$, $\alpha^2$, $\alpha^3$, $\alpha^4$, and $\alpha^5$. In general, the input symbol duration for a substream $\alpha^J$ will be equal to $2^N T$, where N is the level number for the $J^{th}$ input substream with respect to the root node (N=1).

Figure 4:
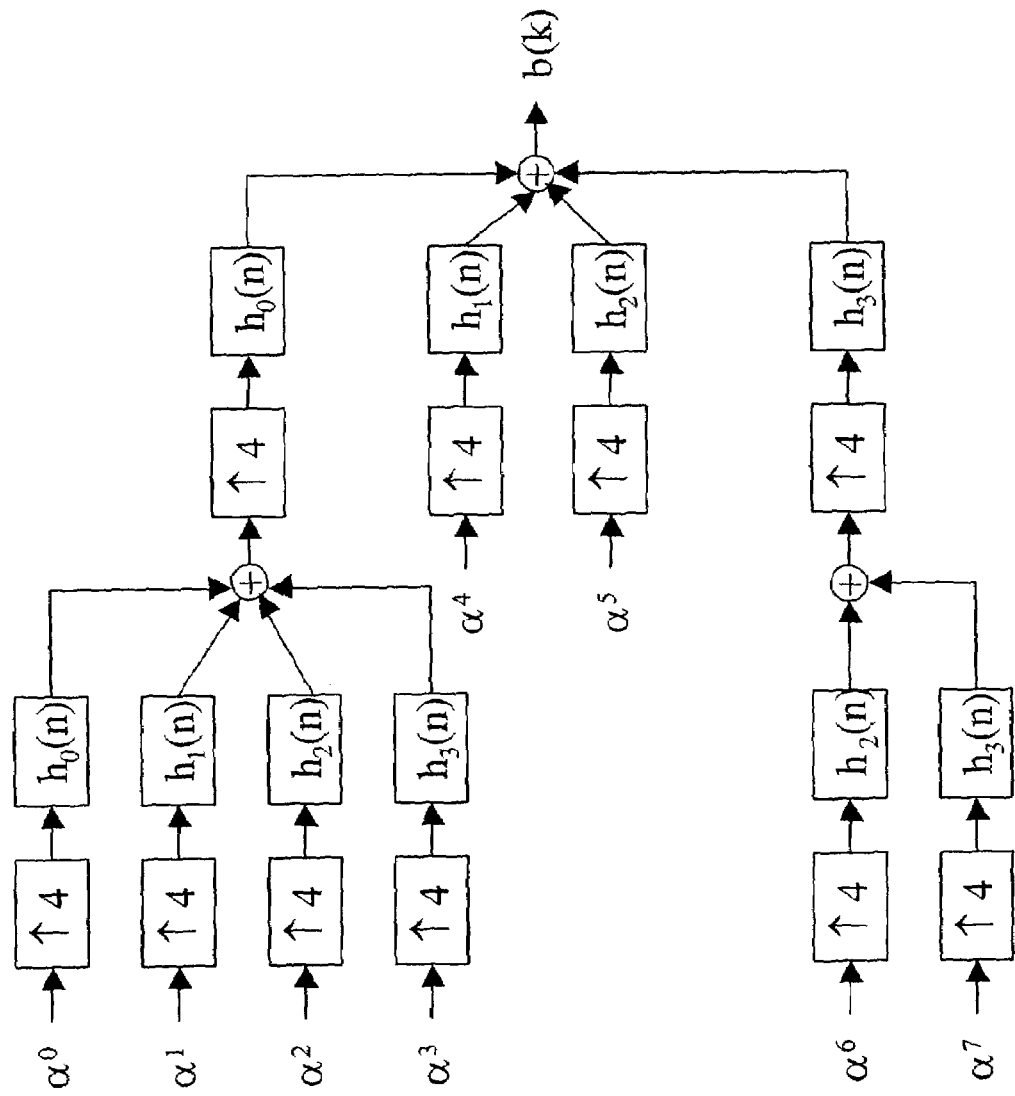
FIG. 4 is a block diagram of a non-uniform filter bank used in a transmitter in accordance with an embodiment of the invention.

Other embodiments are possible by increasing the number of tree levels and arbitrary pruning of these trees. Also, the multiplicity "M" may be greater than two, such that three-band, four-band, and higher multiplicity M-band wavelet packet systems are further embodiments for enhanced time-frequency partitioning flexibility. FIG. 4 shows a four-band, two-level IDWPT filter bank embodiment. In this case, four FIR filters $h_i(n)$ are required with $i \in \{0,1,2,3\}$. These filters may be created by modulating a lowpass filter impulse response h(n) with a cosine (or sine) of appropriate frequency and arbitrary phase. The h(n) lowpass filter has support in $[-\pi/2M, \pi/2M]$ and is effectively shifted by $(i+\frac{1}{2})\pi/M$ to create $h_i(n)$ as follows:

$$h_i(n) = h(n)\cos\left(\frac{\pi}{M}\left(i+\frac{1}{2}\right)\left(n-\frac{\alpha}{2}\right)\right)$$

where $\alpha$ is the modulation phase.

In one embodiment h(n) and g(n) are implemented as even order, linear phase FIR filters in the IDWPT and DWPT tree structures. For perfect reconstruction ("PR") of the constituent complex symbol stream by the receiver, the synthesis (IDWPT)/analysis (DWPT) filter bank cascade must be reducible to a simple delay between input and output. To be invertible as such, the filter banks must possess a characteristic linear phase. A common assumption in the art of filter bank design has been that perfect reconstruction under orthogonality and linear phase constraints is only possible for Haar wavelet filters and other trivial cases. The solution often in practice is to substitute the weaker biorthogonality constraint for orthogonality in the design of the linear phase conjugate mirror filters.

In a wireless communications setting, Additive White Gaussian Noise ("AWGN") processed by a receiver's biorthogonal analysis filter bank will be correlated, disrupting correct symbol recovery. Full orthogonality is also vital to prevent the occurrence of intersymbol interference ("ISI"). An orthogonal basis set can be created with filters h(n) and g(n) if the following power complementary relation is true:

$$|H(f)|^2 + |G(f)|^2 = 2, \forall f \in R$$

The CMF pair must also be even order for orthogonality to hold. Linear phase confers symmetry on the designed filters, which benefits timing recovery algorithms as well as efficient implementation by reducing the needed multiplications and coefficient storage by almost half.

The application of even order, linear phase CMFs is made feasible by either of the following: 1) A delay tap is added to the analysis h(n) filters and a delay tap is added to the synthesis g(n) filters, or 2) A delay tap is added to the analysis g(n) filters and a delay tap is added to the synthesis h(n) filters.

In one embodiment, the scaling function, $\phi(n)$, is the Square Root Raised Cosine ("SRRC") derived by sampling the SRRC pulse shaping function. However the SRRC scaling function does not have compact support in the time domain. In order to use the SRRC wavelets in a CMF pair, the impulse response is truncated evenly about the point of symmetry. The truncated impulse response produces a near-orthogonal SRRC CMF pair with linear phase that is an approximation of the Meyer scaling function. The SRRC pulse shaping function is known in the art and is expressed as follows:

$$\phi(t) = \frac{\sin(\pi(1-\beta)t) + 4\beta t\cos(\pi(1+\beta)t)}{\pi(1-(4\beta t)^2)t}$$

The factor $\beta$ in the scaling function is the roll-off parameter and specifies the excess bandwidth required over Nyquist signaling. The desirable parameterization using $\beta$ to control spectral occupancy and excess bandwidth of the dyadic scaling function holds for $\beta<\frac{1}{3}$. The SRRC is also a valid M-Band scaling function. A general bound for $\beta$ for M>1 can be expressed as $\beta \leq (M-1)/(M+1)$. For example, $\beta \leq \frac{3}{5}$ for the four-band IDWPT of FIG. 4.

In another embodiment, the scaling function is the Modified Gaussian. The Gaussian waveform in its basic form known in the art causes intersymbol interference because it is not shift-orthogonal. By applying an orthogonalization trick on the Gaussian waveform, a feasible frequency domain expression for the Modified Gaussian scaling function is obtained as follows:

$$\Phi(f) = \frac{e^{-\sigma^2 T^2 (2\pi f)^2}}{\sqrt{\sum_{l \in Z} e^{-8\sigma^2 T^2 \pi^2 (f+l/T)^2}}}$$

The FIR filter coefficients for the Modified Gaussian scaling function are obtained by fitting a least squares approximation design to the frequency response above. The resultant Modified Gaussian wavelets are near orthogonal with linear phase. The parameter $\sigma T$, based on the Gaussian pulse variance $4\sigma^2 T^2$ can be varied across positive real values.

The output of the IDWPT component is a series of pulses that are logically grouped into a supersymbol of duration JT, where J is the number of distinct time-frequency atoms in a supersymbol and T is the period of a single symbol from the source input stream. In one embodiment, output b(k) sequence is input to the pulse shaping component 114 shown in FIG. 5. The b(k) sequence is upsampled at a rate $L \geq M$ to permit the pulse shaping to be achieved in digital format using the filter coefficients $\phi(n)$ corresponding to the scaling function. As the value of L increases, the pulse shape is interpolated to a finer resolution, aiding timing recovery at the receiver. The shaped pulses are passed through a D/A (Digital to Analog) converter whereby a continuous analog waveform is created. The analog image rejection filter has a lowpass bandwidth exceeding the Nyquist sampling bandwidth of the scaling function filter, and acts to remove the images produced by upsampling by the factor L. The design requirements for the image rejection filter are eased with larger values of L.

In another embodiment, the b(k) sequence is applied as weights to an analog impulse generator, with the result fed to an analog pulse shaping filter with the scaling function response $\phi(t/T)/\sqrt{T}$ to create the analog baseband waveform.

The analog baseband waveform is admitted to a final processing stage to make it suitable for transmission on a radio frequency ("RF") channel. Dual signal paths are maintained to isolate the real component of the symbol stream from that of the imaginary component. Duplicate, identical IDWPT filter banks and pulse shaping components are used to keep the processing separated into two channels. Quadrature multiplexing ("QM") is used to impart the waveform on inphase ("I") and quadrature ("Q") RF carrier signal components using the real and imaginary baseband components, respectively. The QM technique is known in the art and may involve direct conversion to RF or indirect conversion using an intermediate frequency ("IF") stage. Waveform power amplification may be introduced at any point before, during, or after RF upconversion to boost the transmitted signal's range.

Channel

The RF channel propagation characteristics may include AWGN as well as time-dispersive and time-variant anomalies. The pure AWGN channel assumption is valid only for linear time invariant ("LTI") channels such as certain geostationary satellite and microwave line-of-sight ("LOS") channels. The propagation of signals through wireless channels that are time-dispersive results in the transmitted signal arriving at the receiver through multiple paths attributed to reflection, refraction, or diffraction. Multipath propagation results in a received signal that is a superposition of several delayed and scaled copies of the transmitted signal giving rise to frequency-selective fading. For the small-scale fading that results from several multipath components with no dominant signal component present (such as a LOS component), the fading obeys a Rayleigh probability density function ("pdf") and is known as Rayleigh fading. When a dominant (specular) component is present, the fading is represented by a Ricean pdf and is known as Ricean fading. Channels with both Ricean and Rayleigh fading statistical characteristics are possible.

The transmitter addresses multipath-induced, frequency-selective fading by way of modulating the data stream onto sub-bands at proportionally lower symbol rates. This has the effect of dilating the duration of the individual symbols within the orthogonally multiplexed supersymbol. By making the symbol rate less than the channel coherence bandwidth (which is reciprocally related to the maximum excess delay of the scattered signal paths), flat fading will predominate.

The transmitter also counters the potential for fast fading due to time-variant Doppler effects from relative motion between the transmitter and receiver. The transmitted symbol rate on each of the sub-bands is lower bounded by a maximum fade rate. By so doing, the channel parameters appear to be static over several symbols for a more manageable slow fading effect. In practice, the ratio of transmit symbol rate to fade rate is 100:1 or greater to achieve this objective.

An irreducible bit error rate is possible with both fast and frequency-selective fading. This means that a threshold has been reached whereby increasing the signal-to-noise ratio ("SNR") will not yield any further BER benefit. Channel forward error correction ("FEC") coding reduces the required SNR at the receiver instead of increasing the transmitted signal energy, so the irreducible error floor is effectively lowered. FEC coding, combined with interleaving for a "memoryless" channel, is also the prevalent means of mitigating the net channel attenuation on slow and flat fading channels. The system configuration incorporates FEC coding and interleaving as described in the section entitled, "Error Correction." For the narrowband and impulsive interference components that escape avoidance at the transmitter, the error correction subsystem provides additional remedial action to recover the desired signal at the receiver.

Receiver

The desired signal is downconverted either directly, or via an IF stage, to baseband real and imaginary components using quadrature demultiplexing techniques known in the art. Carrier acquisition for WPM using QAM complex input symbols can be considered analogous to that of single channel QAM, since the two share an equivalent power spectral density. QAM operates on a suppressed carrier basis. For coherent demodulation at the receiver the phantom carrier must be determined; there are two general ways to do this: (1) redundant information in the form of pilot tones or training sequences or (2) processing of the received signal to extract a direct carrier estimate or error estimate. The second group of methods is preferred over the first group that has lower power and bandwidth efficiency due to the overhead. One embodiment uses a fourth power non-linear operation to remove the modulation and extract a carrier signal for the receiver's oscillator to lock onto. Other methods known in the art of carrier acquisition, including Costas loops and decision-directed feedback loops, may also be used for establishing a local frequency/phase reference. Following carrier acquisition, there is a need to switch over to a carrier tracking mode to continue to follow the dynamics of the transmitted signal throughout reception.

As shown in FIG. 6, the baseband real and imaginary signal components y(t) enter a dual processing path analogous to that of the transmit side, but for the ultimate purpose of signal detection. The analog components are initially sampled, converted to digital values with an A/D (Analog to Digital) converter, passed through an anti-aliasing filter and subsequently match filtered using the inverse response, $\phi(-n)$, of the transmitter scaling function filter coefficients. In another embodiment, the baseband waveform components are first passed through an analog matched filter with response $\phi(-t/T)/\sqrt{T}$, and then sampled and digitized.

The interpolator shown in FIG. 6 may be used to determine values of the waveform at instants other than the discrete sample times. The decimator's function is to choose the sampling instant that best mitigates intersymbol interference and captures the peak amplitude of a WPM pulse. The downsampling is by a factor L equivalent to that used in transmitter upsampling. The operation of the interpolator and decimator is described in more detail in the section entitled "Symbol Synchronization."

Most digital data streams require some sort of frame structure to convey their logical grouping to the receive end application (e.g., ASCII codes and digital speech packets). For WPM, this equates to supersymbol synchronization. The receiver DWPT is inherently shift-variant, so that an offset of even one pulse in a cluster of WPM orthogonal multiplexed symbols will result in corrupt decoded data. Therefore, there must exist a start of transmission reference point for the receiver to properly- demodulate the WPM coefficients. A synchronization codeword or "unique word" ("UW")" serves this purpose for detecting the beginning of a transmit frame. For the WPM waveform in continuous transmission mode, a single UW is needed to demarcate the first WPM pulse to enter the receiver DWPT filter bank. Upon achieving initial frame synchronization, the symbol synchronization algorithm will thereafter track the dynamic timing offset.

The UW prefix preferably has constant amplitude and zero autocorrelation ("CAZAC") properties. The correlation sidelobes correspond to the value of the UW correlated with a time-shifted version of itself. Low sidelobes are desirable for a UW so that a distinct peak occurs only upon perfect superposition of the main lobe. Uncorrelated noise and co-channel interference are unlikely to produce a false frame lock detect with a sufficiently high peak threshold. In one embodiment, the WPM waveform uses a UW prefix devised by Chu, described in equation form as follows:

$\theta[n] = n^2 \pi/N$, where N is the sequence length and $0 \leq n < N$

The transmitted signal inphase and quadrature components are then:

$I[n] = \cos(\theta[n])$ and $Q[n] = \sin(\theta[n])$

The decimated matched filter outputs, $\hat{y}(k)$, are input to the DWPT analysis processing that employs parallel filter banks (one each for real and imaginary signals) to yield the orthogonal demultiplexed complex QAM symbol stream. The DWPT in the receiver utilizes the equivalent optimal time-frequency partition structuring for its filter bank as the transmitter's IDWPT.

Figure 7:
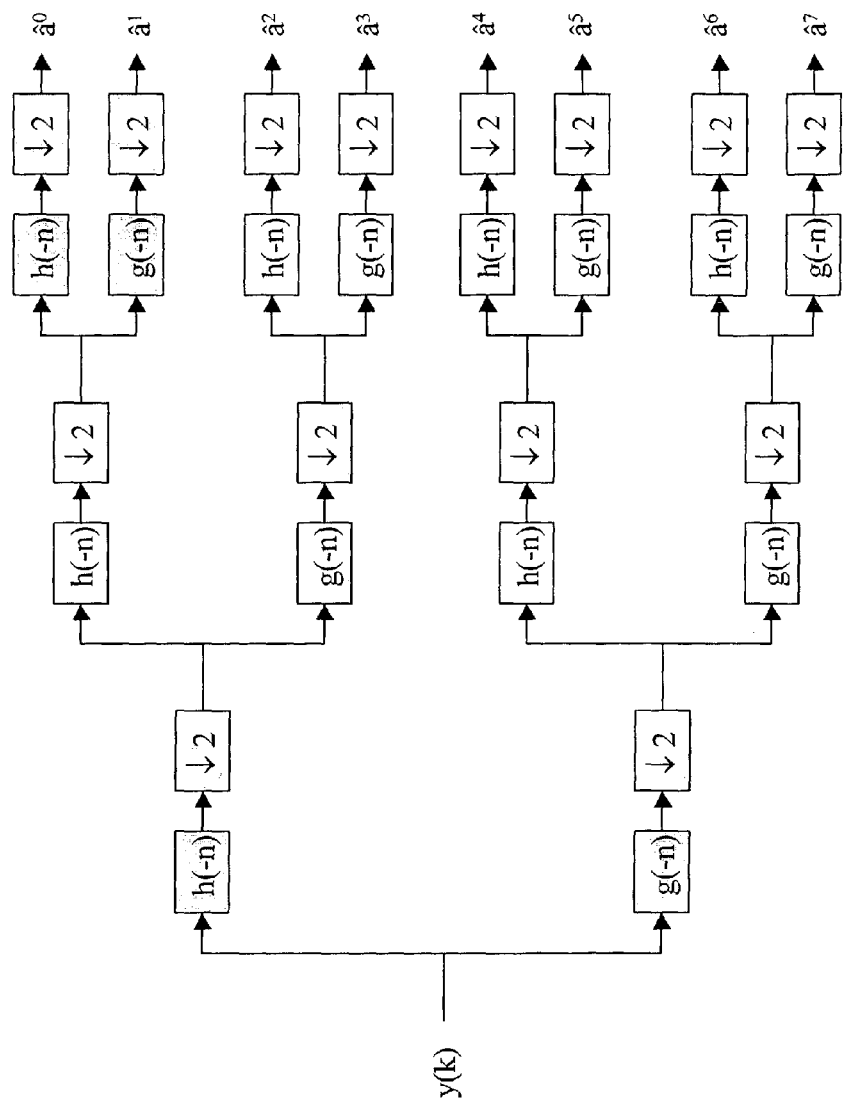
FIG. 7 is a block diagram of a uniform filter bank used in a receiver in accordance with an embodiment of the invention.

FIG. 7 shows a uniformly structured, three-level, binary filter bank tree for DWPT processing that is matched to the transmitter IDWPT of FIG. 2. Shaded blocks in FIG. 7 indicate the retained tree structure elements for a Discrete Wavelet Transform ("DWT")—a subset of the IDWPT that is based on dyadic expansion. Starting at the root input node, the sequence $\hat{y}(k)$ is input to a CMF pair consisting of coefficient reversed versions of the g(n) and h(n) FIR filters of the transmitter IDWPT filter bank. The output of each of these filters is then downsampled by a factor two (i.e., every other sample is discarded) before proceeding to the next level. The $N^{th}$ level of the DWPT filter bank tree is composed of between 1 and $2^N$ output nodes depending on the pruning selection. Because this is a uniform filter bank DWPT with no pruned nodes, the output symbol period T for each of the substreams $\hat{a}^0, \hat{a}^1 \ldots \hat{a}^7$ is 8T.

Figure 8:
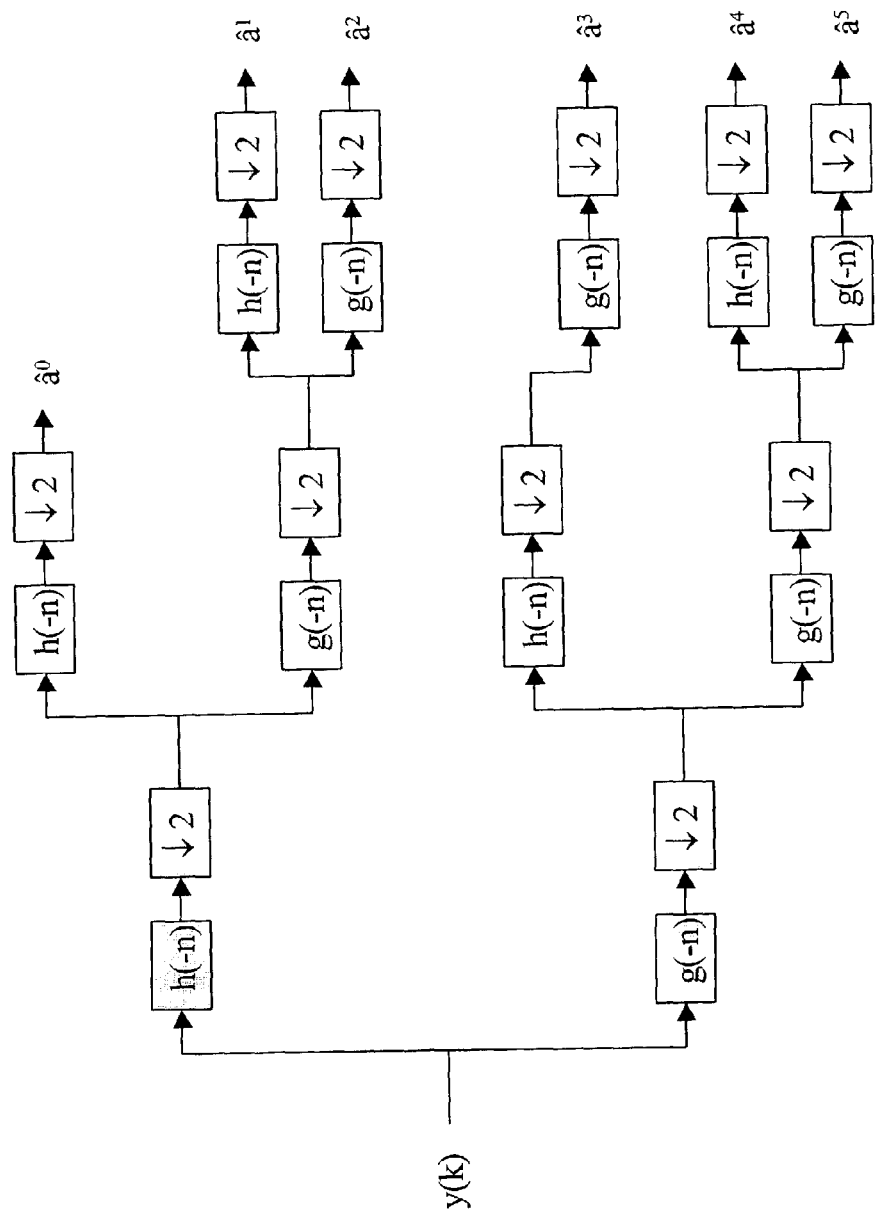
FIG. 8 is a block diagram of a non-uniform filter bank used in a receiver in accordance with an embodiment of the invention.

FIG. 8 shows another embodiment of the DWPT filter bank tree that is non-uniform. For this pruned tree structure, the output symbol periods for the substreams are 4T for $\hat{a}^0$ and 8T for $\hat{a}^1, \hat{a}^2, \hat{a}^3, \hat{a}^4$, and $\hat{a}^5$.

The parallel QAM complex symbol outputs of the DWPT are passed to a multiplexer 136 that converts them to a serial sequence at rate 1/T. The multiplexer output stream is then detected onto a QAM symbol constellation. The QAM symbol decisions are demapped to the original binary source stream.

Supersymbol Tuning

Unlike other orthogonal transforms, such as Fourier and Walsh, that require an equal time-frequency atom area for all basis functions, WPM allows a more flexible time-frequency atom mapping. The transmitter uses the flexibility of WPM to avoid known signal impediments. The transmitter uses a filter bank with an adaptive tree structure to isolate the impact of the signal impediments to a minimal number of atomic signal components. The tree structure is adapted or pruned to accomplish the desired time-frequency atom mapping for a given set of signal impediments.

The number of possible time-frequency mappings precludes analyzing each possible mapping. However, the following two principles suggest a method for efficiently identifying the desired mapping and corresponding tree structure.

I. If reverse (forward) tuning reduces the partition cost, then forward (reverse) tuning of the same elements will raise the cost; and II. If forward (reverse) tuning raises the partition cost, then no further forward (reverse) tuning will reduce the cost.

As used herein the term reverse tuning refers to the composition of two filter bank nodes into one filter bank node and the term forward tuning refers to the decomposition of one filter bank node into two filter bank nodes. The term cost refers to the number of time-frequency atoms that intersect the signal impediments.

The first principle corresponds to the observation that time-frequency cells get narrow in time with composition and get narrow in frequency with decomposition. An improvement via reverse tuning indicates the presence of a time-domain impulse. Therefore, spreading out the symbols in time by forward tuning increases the likelihood of symbol corruption from the impulse. Similarly, an improvement via forward tuning indicates the presence of a frequency-domain tone. Therefore, spreading out the symbols in frequency by reverse tuning increases the likelihood of symbol corruption from the tone.

The second principle corresponds to the observation that if a time-frequency atom is spread out in frequency and the performance is degraded, then a tone is present and further frequency spreading does not improve performance or decrease the cost. Similarly, if a time-frequency atom is spread out in time and the performance is degraded, then an impulse is present and further time spreading does not improve performance or decrease the cost.

Based on the foregoing principles, the method locks elements of the filter bank to prevent tuning in one direction or the other. Reverse locking an element prevents it from being composed during a reverse tuning operation and forward locking an element prevents it from being decomposed during a forward-tuning operation. The method initially determines the best uniform level and then proceeds to forward tune. During forward tuning, certain elements are forward locked. Once the forward tuning is completed certain elements are reverse locked. The method then proceeds to reverse tune until an optimal mapping is determined.

Figure 9:
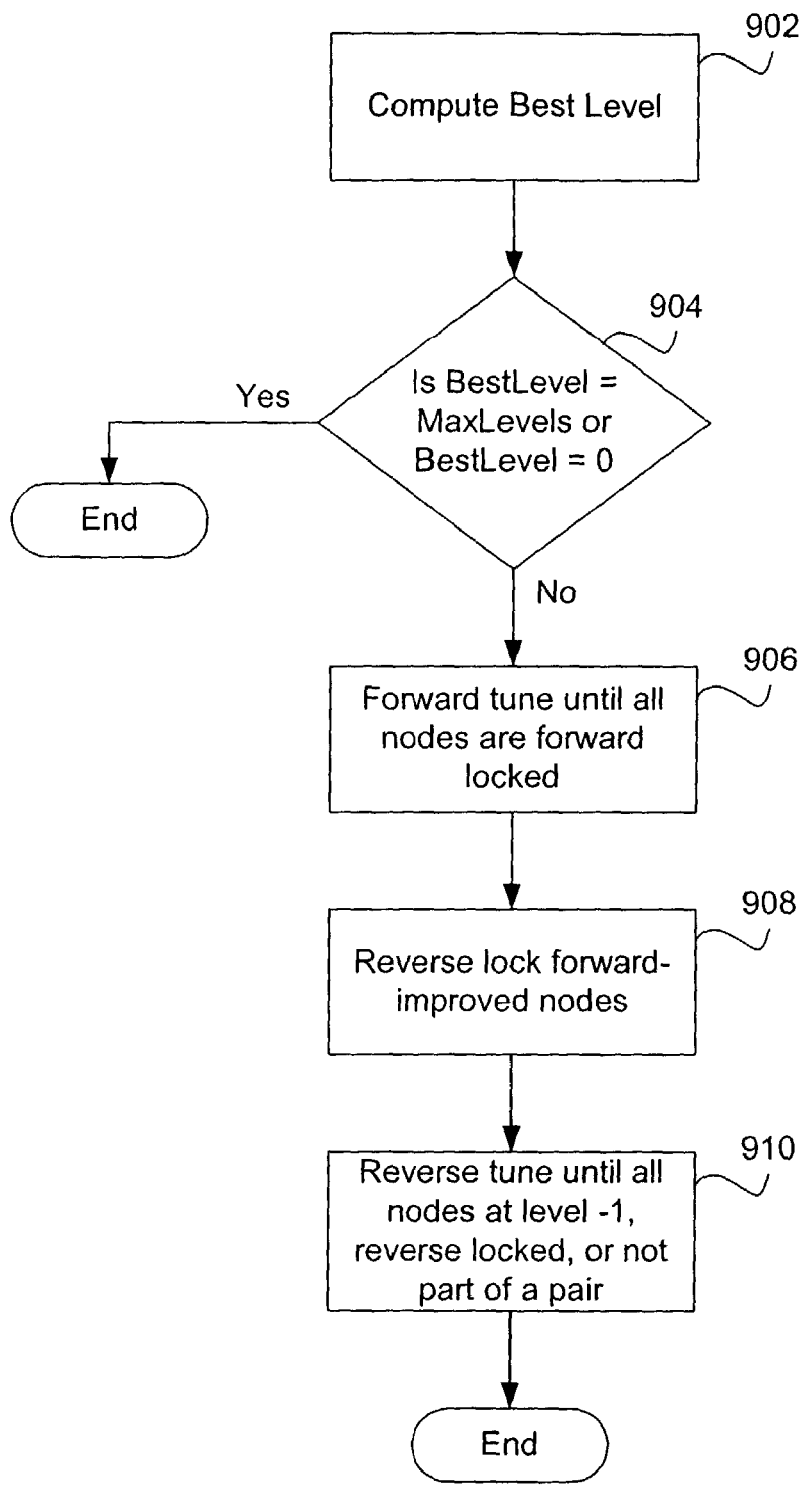
FIG. 9 is a flow diagram illustrating a method for mapping in accordance with an embodiment of the invention.

The method for one embodiment is illustrated in FIG. 9. The method begins at step 902 where the best level is computed. Each level of the filter bank (up to the maximum level) is analyzed to determine the best level. The best level is the level of a uniform filter bank that has the minimum cost. If the cost is the same for different levels, then the configuration with the fewest elements is selected.

Once the best level is determined, then the best level is analyzed in step 904 to determine whether the best level is equal to the maximum level of the filter bank or whether the best level is equal to 0 (QAM). If the determination in step 904 is that the best level is equal to the maximum level or the best level is equal to 0, then the Yes branch is followed and the method ends. However, if the determination in step 904 is that the best level is not equal to the maximum level and is not equal to 0, then the No branch is followed to step 906. In step 906 the filter bank is forward tuned until all nodes are forward locked. During forward tuning, each node is decomposed and the cost of the new partition is determined. If the cost is an improvement, then forward tuning continues. However, if the cost is not an improvement, then the node is forward locked. A node is also forward locked when it reaches the maximum level of the filter bank. Once all of the nodes are forward locked, the method proceeds to step 908 and any node that was improved by forward tuning is reverse locked.

Once the forward-improved nodes are reversed locked, the method proceeds to step 910 and the filter bank is reverse tuned. During reverse tuning, each sibling pair of nodes that is not reverse locked is composed and the cost of the new partition is determined. If the cost is an improvement, then reverse tuning continues. However, if the cost is not an improvement, then the node is reverse locked. Reverse tuning continues until all the nodes are at level −1 or are not eligible for composition because the nodes are reverse-locked or not part of a pair.

Figure 10A:
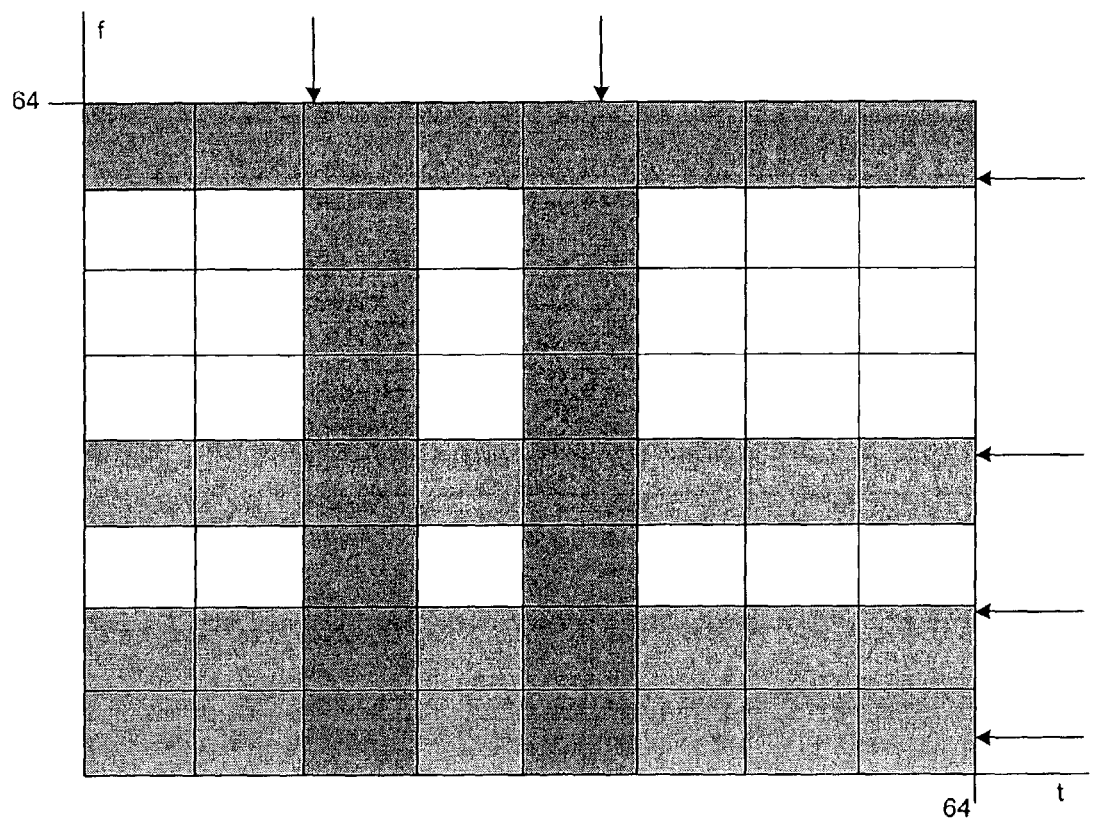
FIG. 10A is a block diagram illustrating a best level mapping in accordance with an embodiment of the invention.
Figure 10B:
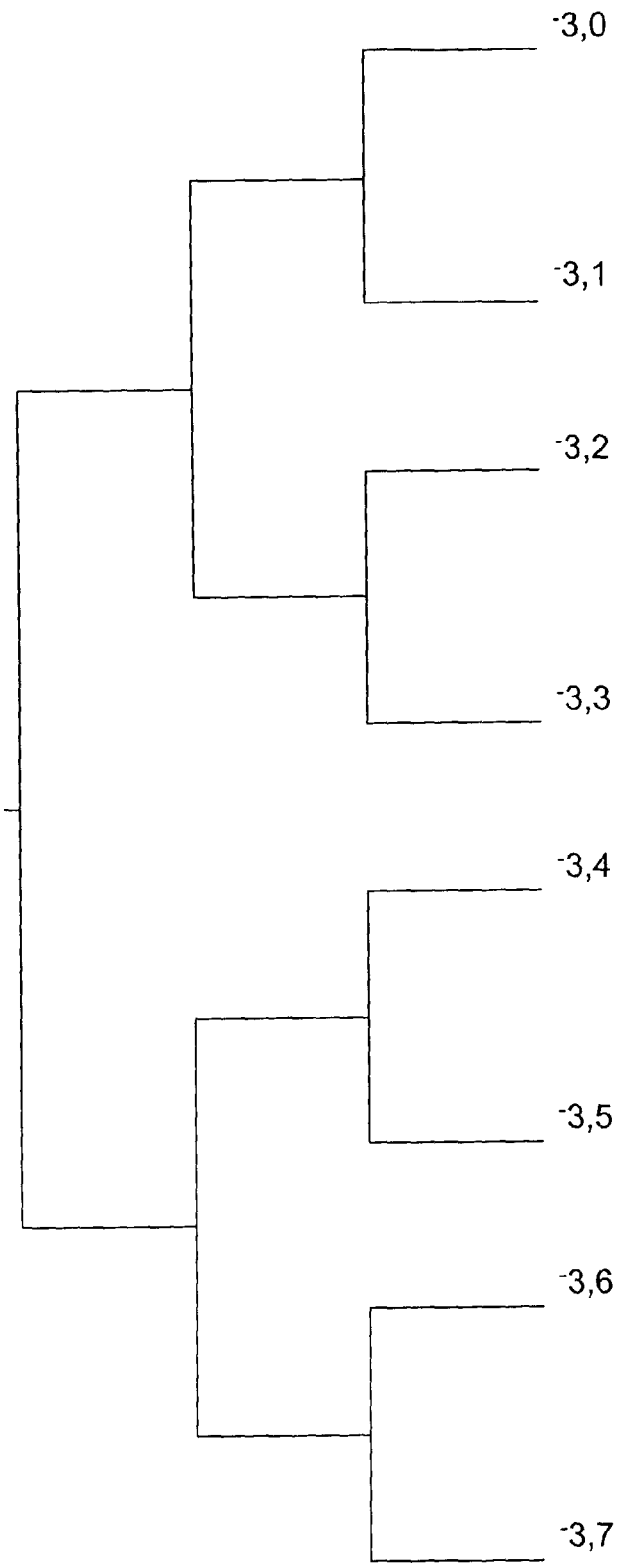
FIG. 10B is a block diagram illustrating a filter tree corresponding to the mapping of FIG. 10A in accordance with an embodiment of the invention.

The following example illustrates an application of the method of FIG. 9 when the maximum level of the filter bank is six and the signal impediments include a 4/2 noise scenario with tones located in frequency atoms 4, 16, 31 and 57 and impulses located in time atoms 17 and 38. The best level for this example is −3. FIG. 10A illustrates the mapping for the best level and shows the cost as 40 atoms. The cost is shown via shading. The filter bank for the best level is shown in FIG. 10B.

Figure 11A:
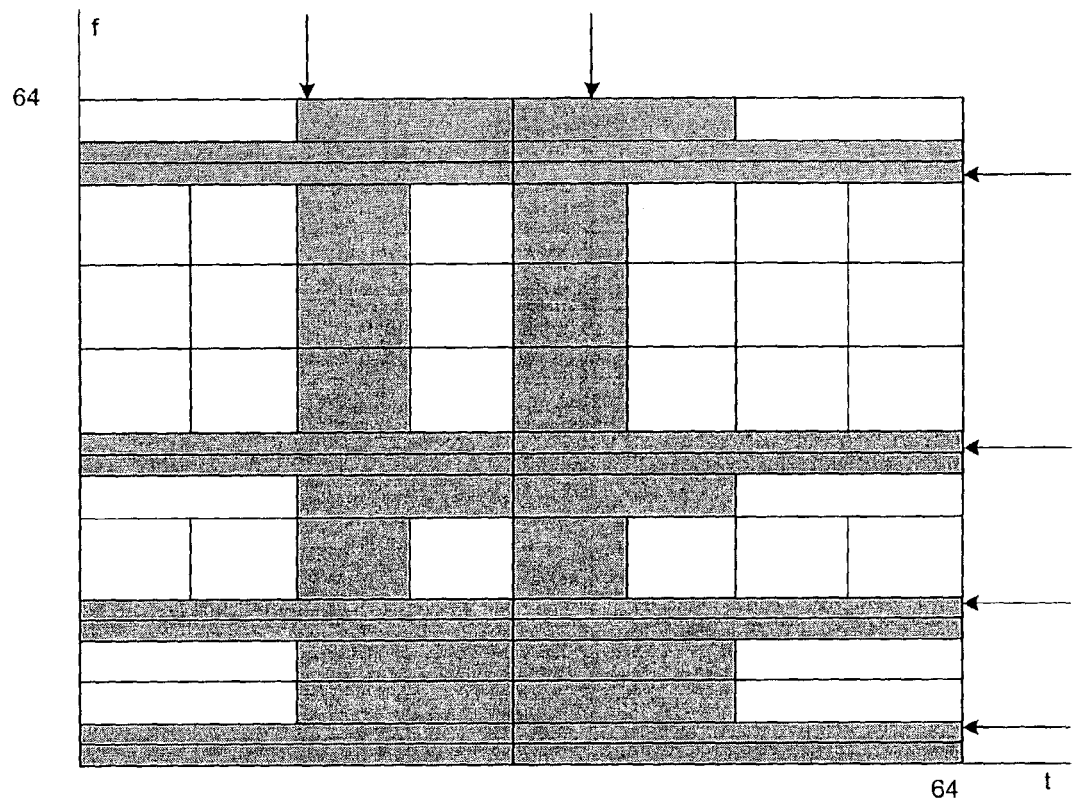
FIG. 11A is a block diagram illustrating the mapping of FIG. 10A after forward tuning in accordance with an embodiment of the invention.

From the best level, the filter bank is forward tuned until the nodes reach the maximum level of the filter bank or the forward tuning degrades the cost. The mapping that results from the forward tuning is shown in FIG. 11A. The cost for this mapping is 32 atoms, which is an improvement of 8 atoms over the best level partition. The filter bank corresponding to FIG. 1A is shown in FIG. 1B. Once the forward tuning is completed, the forward-improved nodes are reverse locked. In this example, nodes (−4, 1), (−4, 2), (−4, 6), and (−4, 15) are reverse locked.

Figure 12A:
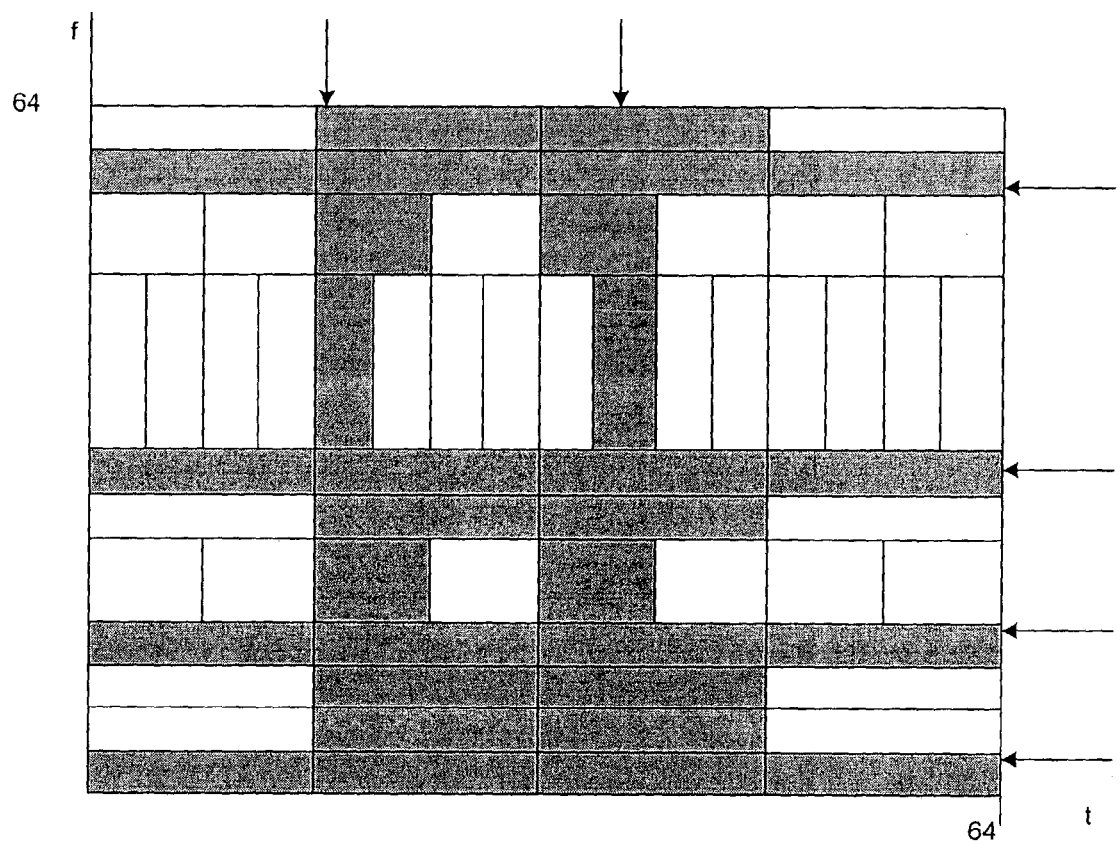
FIG. 12A is a block diagram illustrating the mapping of FIG. 11A after reverse tuning in accordance with an embodiment of the invention.
Figure 12B:
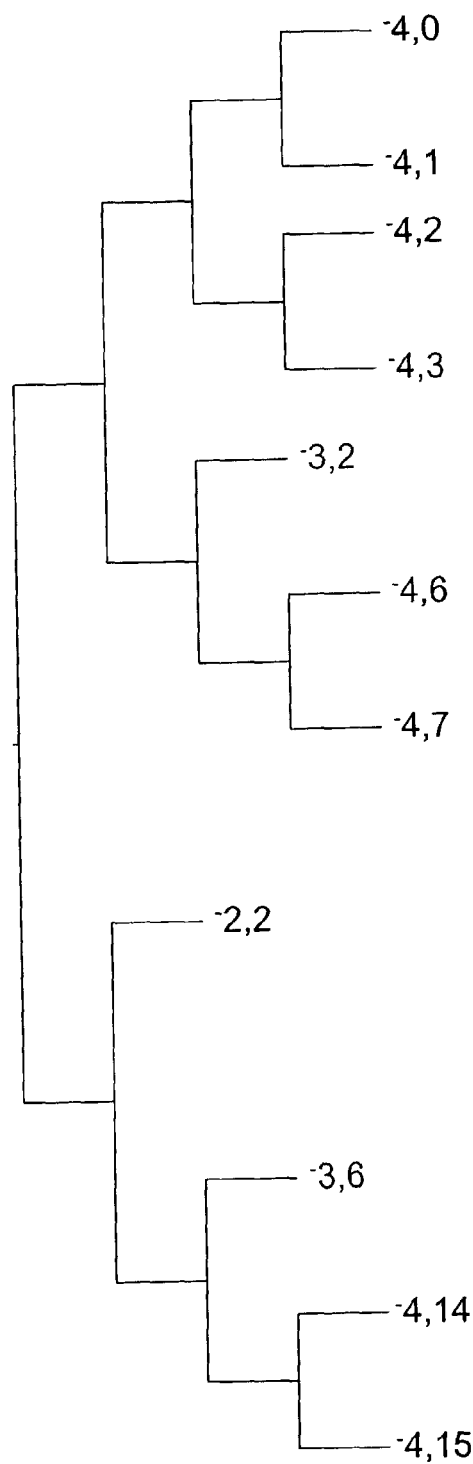
FIG. 12B is a block diagram illustrating a filter tree corresponding to the mapping of FIG. 12A in accordance with an embodiment of the invention.

The filter bank is reverse tuned until all nodes are at level −1, reverse locked or not part of a pair. The mapping that results from the reverse tuning is shown in FIG. 12A. The cost for this mapping is 30 atoms which is an improvement of 2 atoms over the forward tuned tree. The filter bank corresponding to FIG. 12A is shown in FIG. 12B.

In an alternative embodiment, a second reverse tuning is performed. This additional reverse tuning is performed after the best level determination. Any nodes that are improved by reverse tuning are forward locked so that they are not decomposed during forward tuning. Once the reverse tuning is performed, the method continues as described above beginning with step 906.

Symbol Synchronization

Symbol synchronization is performed at the receiver. The key to symbol synchronization is estimating the modulation state transition points to determine the optimal sampling instant. The optimal sampling instant is the instant that mitigates intersymbol interference and captures the peak amplitude of a symbol. However, there is uncertainty at the receiver as to the beginning and end of a transmitted symbol due to the delay between the transmitter and the receiver. The delay includes both static and dynamic components. The static component of the delay is caused primarily by the propagation delay and local oscillator differences at the transmitter and the receiver. The dynamic component of the delay is caused primarily by the time dispersive effects of the channel.

A symbol reaches the receiver after a delay of $nT+\epsilon T$, where T is the transmitter symbol timing scale, n is an integral number of symbol intervals and $\epsilon$ is a fractional portion of a symbol interval. The only reference the receiver has is its own sampling oscillator, free running at period $T_s$. The receiver estimates the delay in terms of its clock, $T_s$, as shown below.

$$(m_n+\mu_n)T_s=(n+\epsilon)T$$

where $m_n$ is an integral number of sampling clocks and $\mu_n$ is a fractional number of sampling clocks. The ratio $T/T_s$ is typically not an integer. Thus, $\mu_n T_s$ is time-variable even though $\epsilon T$ is constant. In addition, the time instants $m_n T_s$ when samples are selected follow an irregular (but deterministic) pattern on the time axis.

The sampled output of the matched filter at the receiver is referred to as $r(kT_s)$. Typically, a digital, time-variant filter, $H_1(\exp(j\omega T_s), \mu_n T_s)$, is used to interpolate a set of samples, $r(kT_s+\mu_n T_s)$. The time shift $\mu_n$ is a variable that is used to update the tap coefficients. FIG. 13 illustrates an exemplary digital interpolator implemented as a bank of FIR filters known as a Farrow structure. However, if the ratio $T/T_s$ is much greater than two, then interpolation may not be required. In either case, a subset of the set of samples, $\{y(m_n T_s)\}=\{z(nT+\epsilon T)\}$, is selected for further processing via decimation.

The receiver implements a feed forward, decision directed synchronization process that is pulse shape independent and that does not require known synchronization data. The synchronization process is feed forward because the timing parameter, $\epsilon$, is estimated directly. The process is decision directed because it uses detected symbols as correct values in the timing estimate computation. The synchronization process uses all of the WPM subchannels to determine the sampling timing error so that the process works well at low signal to noise ratios ("SNR").

One symbol synchronization process that has been identified and characterized for a special case of WPM, a uniform filter bank tree structure, uses a timing estimate in a feed forward, decision-directed configuration. This solution uses the maximum likelihood function as shown below.

$$\hat{\epsilon} = \underset{\epsilon'}{\operatorname{argmax}} \sum_{i=1}^{M} \sum_{k=0}^{K-1} y_{i,k} g_i \hat{a}_{i,k}$$

The implementation of this symbol synchronizer is a hybrid form, employing both analog and digital elements. The timing estimator is formed by digitally processing matched filter samples and symbol decisions. The synchronization correction, however, is performed by adjusting the phase of an analog Voltage Controlled Oscillator ("VCO"), which serves as the receiver sampling clock.

At the core of the timing estimator is a sum of products of the analysis filter bank end node samples and the respective symbol decisions. An extension has been postulated that instead reconstitutes the orthogonal multiplexed transmitter signal from the symbol decisions and correlates the result with the samples of the receiver's matched filter. Complexity is reduced by concentrating the maximum likelihood processing in one place with only two source inputs. A continuous as opposed to block based operation of the extended timing estimator is expressed as follows.

$$\hat{\epsilon} = \underset{\epsilon'}{\operatorname{argmax}} \sum_{n=m}^{m+N} y_n \left[ \sum_{i=1}^{M} \sum_{k=0}^{N} h_{i,k-n} g_i \hat{a}_{i,k} \right]$$

To decrease the variance and improve the convergence and stability properties of the symbol synchronizer, the present invention uses an all-digital form. In one embodiment, the following timing estimator based on MLDD correlation facilitates this digital synchronizer implementation.

$$\hat{\epsilon} \propto \text{index}\left[\max_{mT_s} \sum_{n=m}^{m+N_pN_s} y_n \left[\sum_{l=0}^{N_\phi} \phi_{l-n} \left[\sum_{j=-\infty}^{\infty} z_n \delta_{n-jN_s}\right]\right]\right] \bmod N_s$$

$$z_n = \sum_{i=1}^{M} \sum_{k=0}^{N_i} h_{i,k-n} g_i \hat{a}_{i,k}$$

$\hat{\epsilon}$=maximum likelihood timing estimator
$T_s$=period of receiver sampling clock
$N_s$=number of samples per WPM pulse
$N_p$=number of WPM pulses used for timing estimate
$N_i$=length of cascaded filter impulse response for the $i^{th}$ subchannel
$N_\phi$=length of scaling function filter impulse response
$g_i$=known channel attenuation factor for the $i^{th}$ subchannel
$\hat{a}_{i,k}=k^{th}$ symbol decision for the $i^{th}$ subchannel
M=# of subchannels
$h_{i,k-n}$=cascaded filter impulse response of the $i^{th}$ subchannel
N=length of cascaded filter impulse response (uniform filter bank)
$y_n=n^{th}$ sampled complex output from the receiver matched filter
m=sliding correlation base index (=0, 1, 2, ... )
$\phi_n$=scaling function filter impulse response
K=number of symbols in subchannel observation window $\delta_{n-jN_s}$ = Kronecker impulse function defined as follows:
    = 1 if $n - jN_S$ is equal to zero
    = 0 otherwise $\sum_{j=-\infty}^{\infty} z_n \delta_{n-jN_s}$ denotes upsampling $z_n$ by a factor $N_s$ The symbol synchronizer avoids the use of analog circuitry of hybrid synchronizers by not adjusting the sampling clock to correct for timing offset. Instead, the receiver sampling clock runs open-loop and at a rate $1/T_s$ that oversamples the input WPM pulses to the matched filter. The innermost bracketed term of the timing estimator is likewise oversampled by $1/T_s$, and the result is pulse shaped using a scaling function filter, $\phi(n)$, equivalent to that of the transmitter. The modulo reduction of the shift index bounds the symbol timing estimate to the interval (−T/2, T/2), where T is the nominally transmitted WPM pulse width. The timing estimator is based solely on correlation principles so the non-conventional shape of WPM symbols is not a concern. The timing estimator can also converge without training symbols, i.e. the timing estimator is not data-aided.

The timing estimator selects the best symbol timing alignment from a finite set of samples per symbol. The sample times have a one-to-one mapping to the shift indices. Preferably, a ratio that is much greater than two samples per pulse interval is used to approximate the ideal sampling instant. In one embodiment, eight samples per pulse interval are used. A pulse interval is used herein to refer to the source input symbol interval T that is orthogonally multiplexed with other symbols in a WPM supersymbol. The innermost summation is formed by passing the product of the $g_i$ channel attenuation factors and the slicer a symbol decisions through the IDWPT.

The size of the timing estimator observation window can be adjusted to compensate for lower received signal to noise ratios. Symbol decision errors become more likely at low SNR. Therefore, increasing the size of the window effectively adds gain and compensates for the low SNR.

Figure 14:
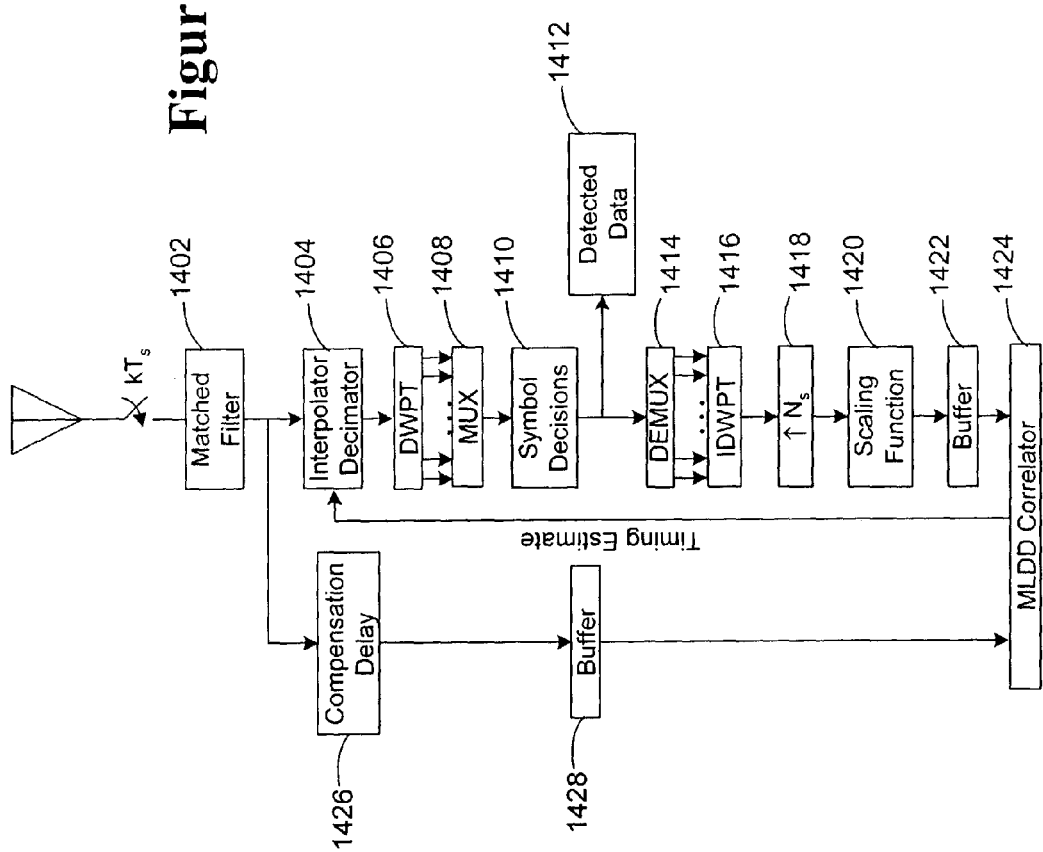
FIG. 14 is block diagram of a symbol synchronizer in accordance with an embodiment of the invention.

A block diagram of an exemplary symbol synchronization component is shown in FIG. 14. The symbol synchronizer includes a matched filter 1402 that filters an orthogonally multiplexed, complex symbol stream to produce one that is free of inter-symbol interference. The input of the digital matched filter is sampled first using a sampling rate that is much greater than two times per pulse interval. In another embodiment, the output of an analog matched filter is sampled instead.

The sampled matched filter output is fed into an interpolator 1404. The interpolator is essentially a filter that derives values between the samples. The interpolator is included because the ratio of the receiver sampling clock to the transmitter symbol clock generally is not an integer. The interpolator is optional. If the sampling rate is fast enough, then the interpolator is not necessary. The decimator selects one sample per symbol based on the timing estimator.

Figure 15:
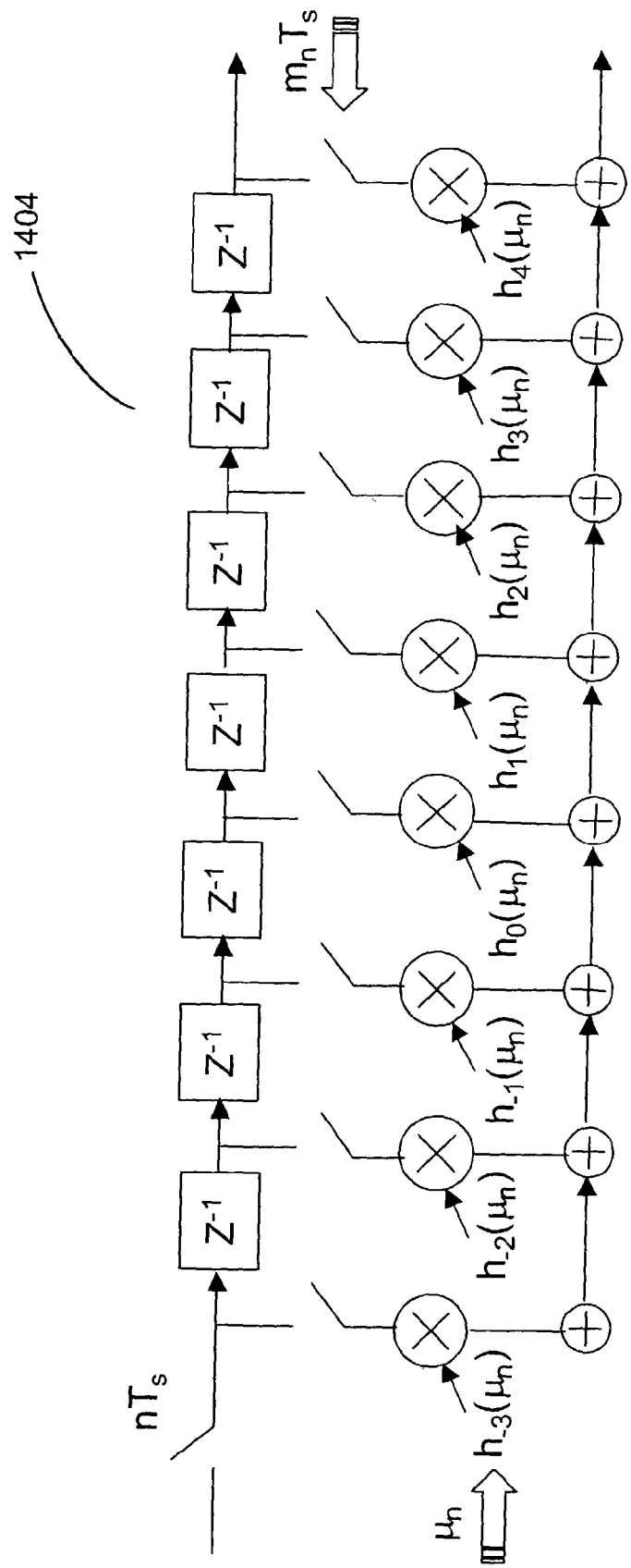
FIG. 15 is a block diagram of a combined interpolator and decimator in accordance with an embodiment of the invention.

In one embodiment the interpolator and the decimator are combined and implemented using a Farrow filter, as shown in FIG. 15. An external timing processor receives the symbol timing estimates from the MLDD correlator, calculates the basepoint ($m_n$) and fractional time ($\mu_n$) delays, and feeds these computed values to the interpolator/decimator subsystem shown in FIG. 15. The basepoint delay determines the samples to select for symbol detection and the fractional time delay is used to update the coefficients of the interpolator in the Farrow filter. FIG. 15 depicts an exemplary cubic polynomial interpolator with eight taps, each a function of the dynamic fractional delay, that provides <−80 dB of SNR degradation for a 4/T sampling rate. The tap coefficients for the interpolator are computed with the following polynomials:

$$\begin{bmatrix} h_4(\mu) \\ h_3(\mu) \\ h_2(\mu) \\ h_1(\mu) \\ h_0(\mu) \\ h_{-1}(\mu) \\ h_{-2}(\mu) \\ h_{-3}(\mu) \end{bmatrix} = \begin{bmatrix} -0.00650 \\ 0.05691 \\ -0.36399 \\ 0.85241 \\ -0.85241 \\ 0.36399 \\ -0.05690 \\ 0.00650 \end{bmatrix} \mu^3 + \begin{bmatrix} 0.03621 \\ -0.23982 \\ 1.11018 \\ -1.71425 \\ 0.84299 \\ 0.01819 \\ -0.06911 \\ 0.01670 \end{bmatrix} \mu^2 + \begin{bmatrix} -0.02971 \\ 0.18292 \\ -0.74618 \\ -0.13816 \\ 1.00942 \\ -0.38219 \\ 0.12601 \\ -0.02321 \end{bmatrix} \mu + \begin{bmatrix} 0 \\ 0 \\ 0 \\ 1 \\ 0 \\ 0 \\ 0 \\ 0 \end{bmatrix}$$

In one embodiment the basepoint and fractional time delays are updated using the equations shown below.

$$m_{n+1} = m_n + L_{INT}\{\mu_n + (T/T_s)(1 + SAW(\epsilon_n - \epsilon_{n-1}))\}$$

$$\mu_{n+1} = [\mu_n + (T/T_s)(1 + SAW(\epsilon_n - \epsilon_{n-1}))] \bmod 1$$

The $L_{INT}\{\}$ function returns the largest integer less than or equal to the bracketed argument. The SAW (x) function is a sawtooth wave with unity period. The SAW(x) function is needed to prevent phase wraparound artifacts from accumulating in the recursion equations. The combined interpolator and decimator shown in FIG. 15 is suitable for modulation waveforms other than WPM.

Returning to FIG. 14, once the samples are selected, then the selected samples are input into a discrete wavelet packet transform ("DWPT") component 1406 which reduces the samples into component symbol streams. A multiplexer 1408 combines the component symbol streams into a serial complex symbol stream. The serial complex stream is fed into a symbol decision component (or symbol detector) 1410. The symbol decision component determines the most likely transmitted symbols. The output of the symbol decision component is the received data 1412 that is used by the system. The DWPT component, multiplexer and symbol decision component correspond to the DWPT component, multiplexer and complex symbol detection function shown in the WPM receiver in FIG. 1.

The most likely symbols are also input into a demultiplexer 1414 that divides the symbol stream into a number of parallel streams. Each parallel stream is fed into an inverse discrete wavelet packet transform ("IDWPT") component 1416 that outputs an orthogonal multiplexed, complex symbol stream. The IDWPT may account for any known non-uniformity in the channel impulse response by weighting the inputs to the component to introduce attenuation factors. The tree structure of the IDWPT is the same as that of the transmitter so that the information energy in the subchannels is maximized which helps minimize the jitter of the symbol timing estimator. The output of the IDWPT component is upsampled 1418 before being processed by the scaling function 1420. The scaling function is applied to the orthogonal multiplexed, complex symbol stream to reconstitute or shape the pulse of the stream to a channel impulse response. The demultiplexer, IDWPT, and scaling function are equivalent to those used for transmitting. In one embodiment, the same components are shared on a half-duplex link for transmission and reception symbol synchronization.

The sampled matched filter output also is fed into a delay block 1426. The delay block compensates for the fixed latency of the processing chain that consists of the DWPT, multiplexer, symbol decision component, demultiplexer, IDWPT, upsampler, and scaling function. The delayed matched filter output is correlated to the output of the scaling function component in the MLDD correlator 1424. A sliding correlator is used to conduct a search for the ML timing parameter, using trial time shift values that correspond to receiver sample clock increments. The observation window size of the sliding correlator can be set to a variable number of WPM pulses. The correlation output value will be greatest when the window is optimally aligned between the matched filter output sample stream and the reconstituted transmit signal. Once the timing estimate is determined, this value is fed into the interpolator/decimator block and is used to determine the optimal sampling instant. The timing estimate indicates which samples of the incoming signal stream correspond to the most interference-free symbol values. The decimator function keeps these samples for output symbol detection and discards the rest.

Figure 16:
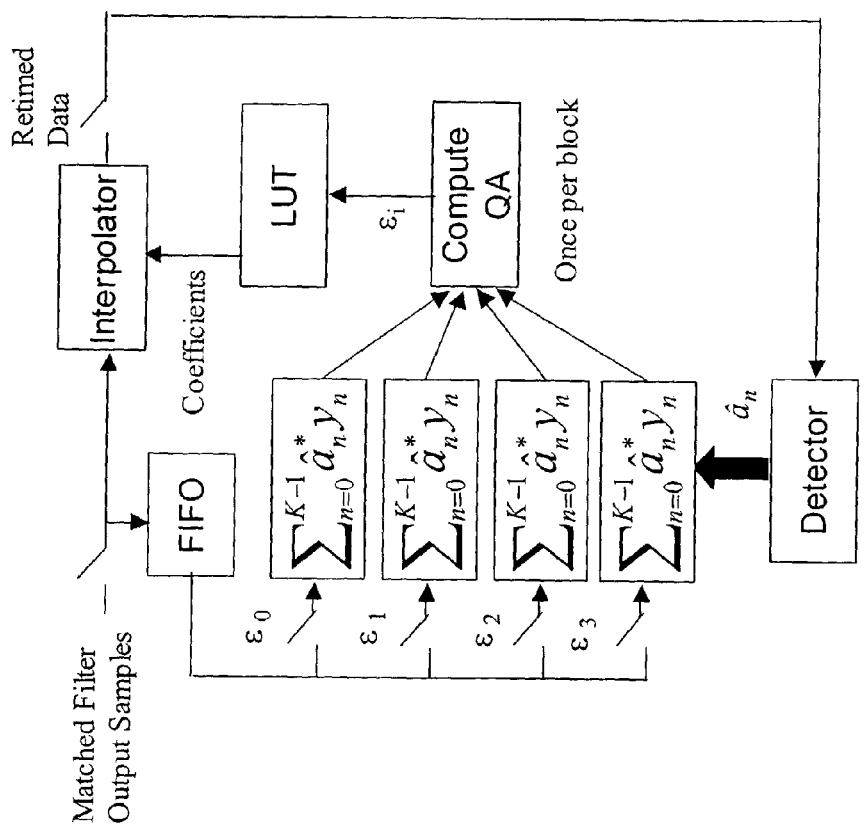
FIG. 16 is a block diagram illustrating the calculation of a quadratic approximation in accordance with an embodiment of the invention.

In order to utilize the interpolator, a means of determining the fractional delay component, $\mu_n$, is required. In one embodiment, the quadratic approximation ("QA") algorithm is the computation method for $\mu_n$. As shown in FIG. 16, the QA algorithm uses a similar structure to the MLDD correlator structure based on remodulated symbol decisions and receive matched filter output samples, excluding the final upsampling and pulse shaping stages. The correlator is also a fixed vector dot product for each trial sample value rather than the previous sliding version. The "LUT" block in FIG. 16 represents a lookup table approach to setting the time-variant coefficients of the interpolator according to the computed time estimate.

The preferred receiver sampling rate for the QA algorithm is 4/T, although a 2/T sampling rate coupled with the fixed-time interpolation of two additional samples may be workable if the distortion can be tolerated. Starting with a block of $4*N_p$ receive matched filter symbol samples (nominally $N_p=64$), four log-likelihood functions are computed for the subset blocks formed by downsampling at the different sample offsets u=(0,1,2,3). The log-likelihood functions are defined as:

$$\Lambda_L(u, \hat{a}) = \sum_{n=0}^{N_p-1} (a_n^*) y_n(u)$$

where $y_n(u)$ is the $n^{th}$ output of the matched filter at offset u; and $\hat{a}_n^*$ is the complex conjugate of the remodulated symbol decision.

Figure 17:
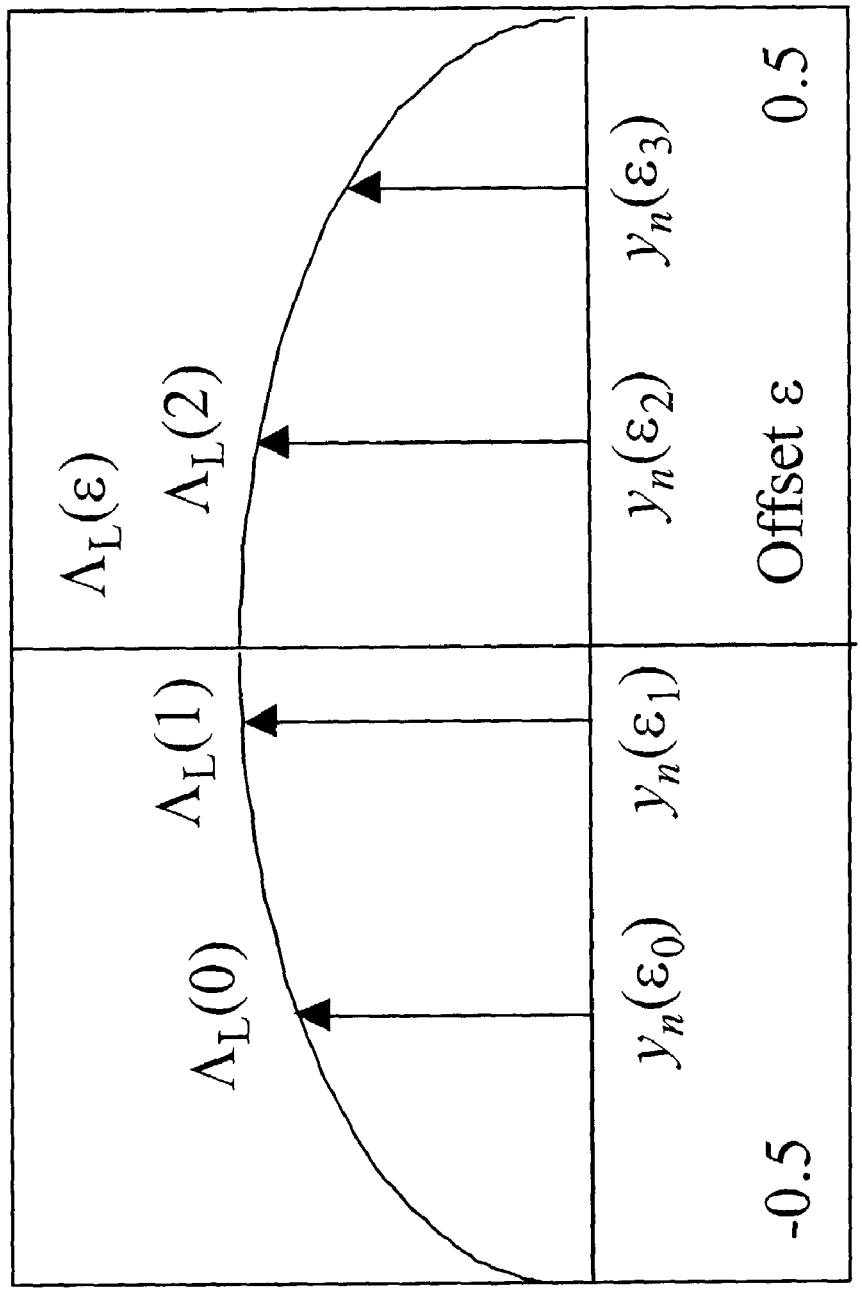
FIG. 17 is a block diagram illustrating the fitting of maximum values to a quadratic polynomial curve in accordance with an embodiment of the invention.

After the four log-likelihood functions are computed, the three maximum values of $\Lambda_L$ are used to fit a quadratic polynomial curve, as illustrated in FIG. 17. The timing estimate, incorporating the fractional delay, is the solution for the peak of the quadratic equation:

$$\hat{\varepsilon} = \varepsilon_0 + \left( \frac{3\Lambda_L(0) - 4\Lambda_L(1) + \Lambda_L(2)}{2(\Lambda_L(0) - 2\Lambda_L(1) + \Lambda_L(2))} \right) \frac{T}{4}$$

The timing estimate then, is relative to the first sample offset $\epsilon_0$ in terms of T/4 unit sample offsets. The quadratic model provides a nice fit for the expected value of the time parameter, with less than 1% error for $|u| \leq 0.5$.

Spread Spectrum Wavelet Packet Modulation

The time-frequency localization capability of WPM can be extended in a spread spectrum sense for improved interference mitigation. A common type of spread spectrum waveform, the Direct Sequence Pseudonoise ("DSPN") signal, is expressed as follows:

$$s(t) = \sqrt{\frac{E}{T}} \sum_{i=0}^{\infty} \alpha_i \sum_{k=0}^{M-1} c_j \phi \left( M \left( \frac{t}{T} - i \right) - j \right)$$

$a_i$=the $i^{th}$ source binary digit
$c_j$=the $j^{th}$ element of a pseudonoise chip sequence (typically $c_j$ is a member of the set $\{-1,1\}$)
M=the length of the pseudonoise chip sequence
$\phi$=the pulse shaping function
T=the symbol period
E=the symbol energy
t=time For such a DSPN signal, the data symbols are decomposed in time with short "chips" utilizing the entire data bandwidth. The DSPN signal has good time dimensionality for addressing time-impulsive interference, but suffers in the presence of frequency-domain noise where all chip symbols are corrupted.

A set of embodiments that incorporate pseudonoise ("PN") code application to achieve finer-grained dimensionality in time and frequency is known as Spread Spectrum Wavelet Packet Modulation ("SSWPM"). The SSWPM signal takes the form:

$$s(t) = \sum_{i=0}^{\infty} \alpha_i \sum_{j=1}^{J} E'_j \sum_{k=0}^{2^{N+L_j}-1} c'_k p_{n_j}\left(2^{N+L_j}\left(\frac{t}{T} - i\right) - k\right)$$

Figure 18:
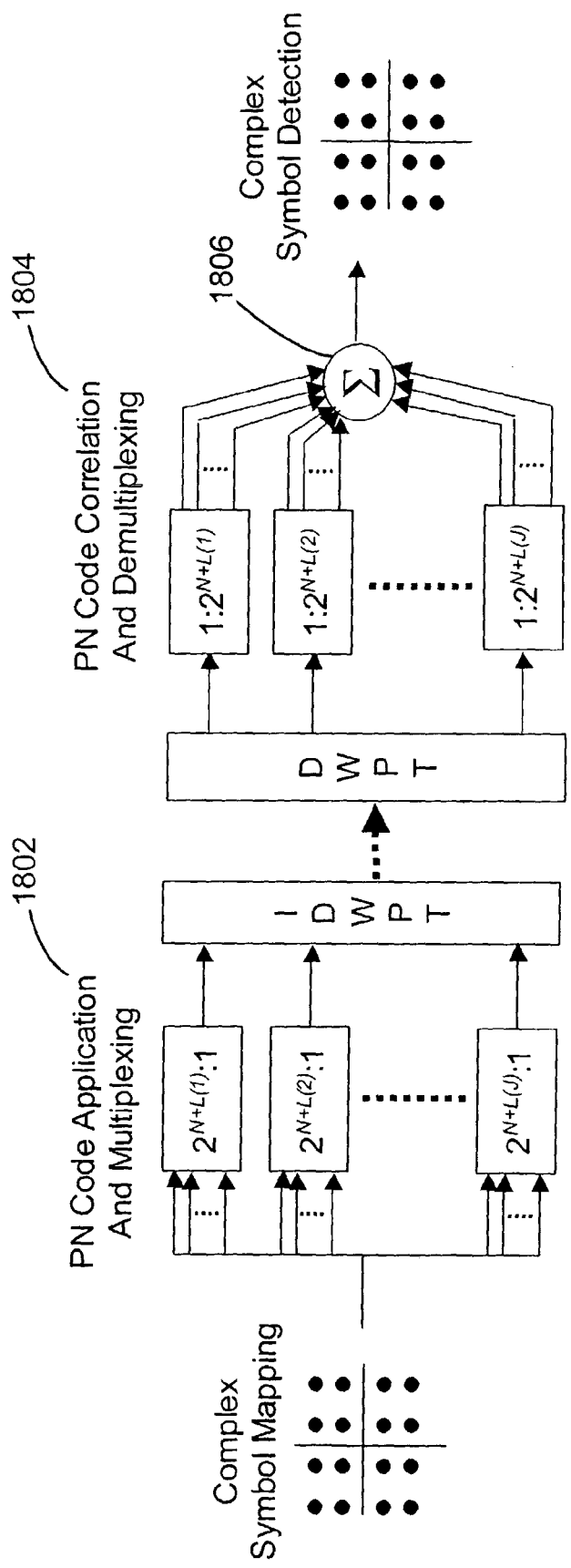
FIG. 18 is a block diagram illustrating Spread Spectrum Wavelet Packet Modulation in accordance with an embodiment of the invention.

= the energy in the wavelet packet function associated with the $j^{th}$ frequency bin in the data bandwidth $L_j$ = the $j^{th}$ level of the IDWPT (DWPT) filter bank $n_j$ = a node at the $j^{th}$ level of the IDWPT (DWPT) filter bank $P_{n_j}$ = the wavelet packet pulse shape defined by the ($L_j$, $n_j$) coordinate of the partition N = the number of levels of the IDWPT (DWPT) filter banks J = the number of input subchannels of the IDWPT(DWPT) filter bank $c'_k = c_{\left(2^{N+L_j}n_j + k\right)}$ = the $k^{th}$ chip pseudonoise sequence element applied to the wavelet packet pulse defined by the ($L_j$, $n_j$) coordinate One example of a SSWPM waveform implementation is shown in FIG. 18. For simplicity, only those details depicting contextually the spread spectrum overlay onto the WPM waveform are shown in FIG. 18. Additional details are shown in FIG. 1. For the SSWPM transmitter, a PN Code Application and Multiplexer component 1804 replaces the demultiplexer of FIG. 1. A bank of J multiplexers with a total of M inputs all receive the same input data symbol. Each multiplexer block also acts as a PN code applicator, so that each input is modulated by one chip of the M-chip sequence (which may come from a longer code). The multiplexer outputs are then at the correct rate for each input of the IDWPT filter bank. This process constitutes intelligent multiplexing resulting from the multirate nature of the filter bank. In particular, the inputs to the transmitter IDWPT filter bank operate at potentially different rates, depending on the decomposition level. Tree levels further from the root node require lower rate input sequences. To account for this feature, the multiplexer is dependent on the partition structure.

For the SSWPM receiver, a PN Code Correlator and Demultiplexer component 1804 and Summation block 1806 replace the multiplexer of FIG. 1. The point of departure with respect to the WPM receiver shown in FIG. 1 is where the demodulated signal exits the J subchannels of the DWPT filter bank. The output subchannels of this transform, just as in the transmitter's inverse transform, carry sequences whose rates depend on the level of decomposition for each subchannel. Again, this multirate character must be accounted for intelligently, hence the presence of demultiplexers which provide to the summer the appropriate M values from J subchannels every $M^{th}$ sample instant. Every DWPT output subchannel is subjected to a reapplication of the PN chips applied at the SSWPM transmitter, resulting in PN removal. The output of the summer is then detected onto the source symbol constellation, yielding, in the absence of errors, the transmit symbol stream.

DSPN is a special case of SSWPM, as is Spread Spectrum M-band Wavelet Modulation ("SSMWM") which has only frequency dimensionality in a given symbol (i.e., each data symbol waveform is composed of separated narrowband pulses covering the entire symbol period). For SSMWM, this is apparent from the parent M-band Wavelet Modulation ("MWM") which is a special case of WPM. Other hybrid systems exist, all of which are special cases of this general SSWPM scheme.

The Supersymbol Tuning algorithm can be used to adaptively select the optimal time-frequency partition with respect to SSWPM. In SSWPM's case, the time-frequency atoms are related to the plurality of PN chips versus symbols.

The Symbol Synchronization algorithm for WPM described above also applies to SSWPM. In the case of SSWPM, the remodulated symbol decisions input to the sliding correlator also include the PN chip sequence processing of the transmitter.

Error Correction

If error correction is desired, then the transmitter and receiver include an error correction subsystem. Preferably, the error correction subsystem implements forward error correction ("FEC") coding, such as Circular Trellis Coded Modulation ("CTCM") or Circular Simplex Turbo Block Coded Modulation ("CSTBCM"). The terms CTCM and CSTBCM are used interchangeably herein. One example of CTCM is described in U.S. Patent Application Publication No. 2002/0196862 entitled "Apparatus and Method of CTCM Encoding and Decoding for a Digital Communication System." Although the embodiments described herein include CSTBCM, other embodiments may include convolutional codes, Reed-Solomon block codes, turbo product codes, and concatenated code versions (e.g., Reed-Solomon outer code with convolutional inner code).

For an even more potent countermeasure to non-Gaussian interference (non-white noise) sources and channel propagation anomalies, the CSTBCM forward error correction component is distinctly mapped onto the orthogonally multiplexed WPM symbols and interleaved to exploit the subband frequency diversity. CSTBCM is a block-based error correction coding method that combines simplex signal mapping and a trellis butterfly structure in a clever way to form a circular tail-biting code. The decoding of CSTBCM can be performed using a circular variant of the decoding algorithm (Bahl Cocke Jelinek Raviv—BCJR) commonly used for turbo product codes ("TPC"). However, the shorter block sizes of CSTBCM provide a bit error rate performance competitive with TPC's large code blocks, approaching the Shannon limit but with considerably lower latency (up to 20-fold improvement).

Figure 19:
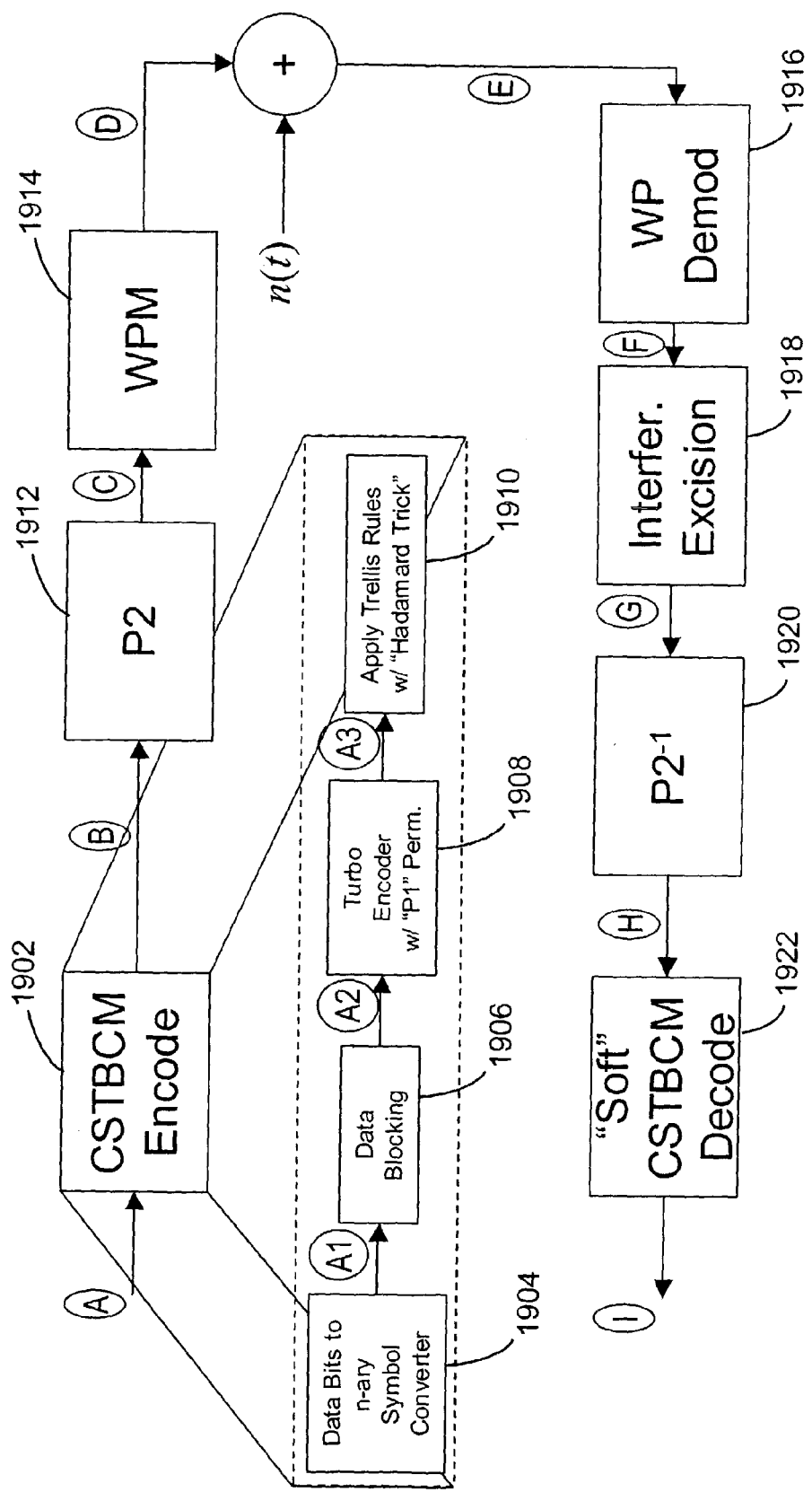
FIG. 19 is a block diagram illustrating CSTBCM encoding and decoding in accordance with an embodiment of the invention.

FIG. 19 illustrates CTCM encoding and decoding. A CTCM encoder 1902 is included in the transmitter and works on blocks of data symbols from an n-ary alphabet, $n=2^k$, each symbol consisting of k bits. The length of each block of symbols is denoted as B. Referring to FIG. 19, at input "A" of the error correction subsystem, a binary non-return-to-zero ("NRZ") data sequence consisting of "1's" and "−1's" is received. The output "A1" of the symbol converter subsystem 1904 is a sequence of k-bit symbols. This symbol sequence is fed to the data blocking subsystem 1906 which produces output "A2", a single block of B symbols, which feeds the embedded turbo encoder 1908. Using a permutation, P1, to modify the ordering of one copy of the input sequence, the turbo encoder provides an output "A3" which is twice as long as the input symbol stream, and includes exactly two of every original input symbol in a pseudorandom order. Thus, output "A3" consists of 2B symbols for each input block of B symbols.

The final step in the CTCM encode process is the mapping of the output symbols to an orthogonal signal space for eventual transmission. This orthogonality is obtained through a concatenated Hadamard matrix 1910. The sequence of modified Hadamard matrices is defined as $H_0=1$, and $$H_n = \frac{1}{\sqrt{2^n}}\begin{bmatrix} H_{n-1} & H_{n-1} \\ H_{n-1} & -H_{n-1} \end{bmatrix}_{2^n \times 2^n}$$

Thus, $$H_1 = \frac{1}{\sqrt{2}}\begin{bmatrix} 1 & 1 \\ 1 & -1 \end{bmatrix} \text{ and } H_2 = \frac{1}{2}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

The scale factor preceding each matrix of bipolar ones is strictly for the purpose of normalizing the Euclidean energy of each row to unity. The significant property of each of these matrices is that all rows (or columns) are mutually orthogonal. That is, letting $r_i=(H_{i,1}H_{i,2} \ldots H_{i,2^n})$ represent any row of $H_2$, and $r_j=(H_{j,1}H_{j,2} \ldots H_{j,2^n})$ represent any other row, $i \neq j$, the inner product $$r_i \cdot r_j = \sum_{p=1}^{2^n} H_{i,p} H_{j,p} = 0$$

This is the mathematical definition of orthogonality for vectors. Also, if one considers the rows of $H_2$ as coordinates in a 4-dimensional Euclidean vector space, then computing the Euclidean distance between any two rows yields the unique solution $\sqrt{2}$. This is another way of determining orthogonality of unit-energy vectors.

An augmentation of $H_2$ is formed by appending a negated copy of itself in four additional rows. The augmented matrix, $H_2^+$ is shown below:

$$H_2^+ = \frac{1}{2}\begin{bmatrix} 1 & 1 & 1 & 1 \\ 1 & -1 & 1 & -1 \\ 1 & 1 & -1 & -1 \\ 1 & -1 & -1 & 1 \\ \hline -1 & -1 & -1 & -1 \\ -1 & 1 & -1 & 1 \\ -1 & -1 & 1 & 1 \\ -1 & 1 & 1 & -1 \end{bmatrix} \begin{matrix} 1, & 5, & 9 \\ 2, & 6, & 10 \\ 3, & 7, & 11 \\ 4, & 8, & 12 \\ -1, & -5, & -9 \\ -2, & -6, & -10 \\ -3, & -7, & -11 \\ -4, & -8, & -12 \end{matrix}$$

The rows of $H_2^+$ are now either orthogonal or antipodal, meaning that their inner product is $-1$. If the rows were exactly the same (perfect alignment) their inner product would be $+1$. Computing distances between rows for $H_2^+$ yields, as expected, either orthogonal distance as before, or antipodal distance of 2 for cross-boundary rows. Thus, the augmented matrix has stronger distance properties than the original. Each row is also accompanied by three labels.

The CSTBCM trellis rules mandate that the output sequence from the trellis encoding process has a certain structure. In particular, each CSTBCM output symbol consists of 3n elements. For the case of n=4, the output symbol consists of 12 elements. The 12 elements are divided into three equal parts of 4 members each. When a symbol comes out of the CSTBCM trellis it is guaranteed to have the property that there are only three nonzero entries constrained such that one entry occupies one of the first four positions in the 12 element vector, the second occupies one of the next four positions (five through eight), and the third element occupies one of the last four positions (nine through twelve).

Due to the triune sparsity of the CSTBCM output symbol, it is possible to construct a shorthand notation for representation by specifying only the sign and position of the three nonzero entries. Thus a CSTBCM output symbol such as

[−1 0 0 0 1 0 0 0 0 0 1 0]

would be represented as (−1 5 11) in shorthand. This shorthand then becomes the indexing vehicle for extracting from $H_2^+$ the three rows with these labels and appending them into a single 12-element sequence now having the property that each 4-element section is at least orthogonal and possibly antipodal to the other two sections in the sequence. This manipulation of CSTBCM output symbols via a modified augmented Hadamard matrix structure is referred to as "The Hadamard Trick." Each 4-ary symbol that goes into the CTCM encoder produces 12 channel bits. Thus, there is significant coding expansion in the transmitted data sequence.

This process is executed for each of the 2B symbols and the output for each symbol is collected in a separate row of a 2B×12 matrix. The resulting sequence "B" is 24B channel bits produced from the original B input symbols. This occurs for every B-symbol block to be transmitted and this bitstream is expected to align with the channel symbol rate.

In channel scenarios which involve non-white noise sources, such as time-impulsive and spectrally narrowband jammers, the CSTBCM output channel bits are potentially devastating to the system because the decoder is tripped up by significant bursty anomalies in the channel. So if several consecutive transmitted codewords are modified by the channel with this correlated noise source, then the result is a bad decode for the whole block. This will heavily burden the bit error rate for the WPM system.

However, additional protection from non-white noise can be achieved by spreading or randomizing the positions of the encoded words before transmission. This randomization process amounts to a permutation, P2, 1912 of the channel bitstream. In one embodiment the permutation, P2, is an interleaving or a reordering of the output matrix B by taking the data in columns instead of reading back the rows. However, other permutations can also be used. Because the permutation provides protection from non-white noise, if the channel scenario involves only white noise sources, then the permutation, P2, is not needed.

In any case, the result C is fed to the WPM block 1914 which consists of a complex symbol mapper followed by a demultiplexer to match the input rates for each bin of the wavelet packet synthesis bank, followed by an inverse discrete wavelet packet transform, then pulse shaping and gain for transmission (signal D). In other words, the signal C is fed into the complex symbol mapper of the WPM transmitter shown in FIG. 1.

On the channel, undesired signal components n(t) are additively mixed with the desired signal, but WPM has strong time-frequency properties that help to mitigate these components insomuch as they are either narrowband or impulsive or both.

The signal E is then demodulated with a forward wavelet packet analysis filter bank 1916 which transforms the signal back to its coefficients F which are then passed through an excision subsystem 1918. The excision subsystem removes the interference that occurred between channel sensing cycles, i.e. the interference that was not detected by the signal impediment component. The excision subsystem truncates the coefficients of the transform that have been affected by the undesired signal. In one embodiment, samples from the filter bank are statistically analyzed to recognize any abnormalities. The signal G is output from the complex symbol detector of the WPM receiver shown in FIG. 1.

The resulting signal G is depermuted by the depermutation component 1920 using the inverse process of the original P2. In one embodiment the depermutation component simply generates a matrix by columns and then reads out the rows in order for a stream H of real numbers (not integers now because of channel modifications) representing a "soft bitstream" which must be decoded by the CSTBCM decoder 1922 to produce signal I which replicates signal A, even in harsh channel conditions.

Wavelet Pulse Shapes

The wireless communication system described herein can accommodate either a Square Root Raised Cosine ("SRRC") pulse or a Modified Gaussian ("MG") pulse via reconfigurable hardware. Other suitable wavelet families also can be used, with minimum requirements being the first Nyquist criterion for the scaling function pulse shape and compact support for Finite Impulse Response ("FIR") filter bank implementation.

Additional alternative embodiments will be apparent to those skilled in the art to which the present invention pertains without departing from its spirit and scope. For example, although symbol synchronization has been described in connection with WPM, the symbol synchronization described herein can also be used with other types of orthogonally multiplexed communication systems, such as systems using local cosine bases. In WPM the time-frequency plane is partitioned with arbitrary frequency intervals, whereas in local cosine bases the time-frequency plane is partitioned with arbitrary time intervals.

What is claimed is:

1. A wireless communication system, comprising:
 a transmitter for transmitting a radio frequency signal to a receiver, the transmitter including:
  a forward error correction ("FEC") encoder for encoding input symbols to generate encoded symbols;
  a permutation component for permutating the encoded symbols;
  a complex symbol mapper for mapping the permutated symbols into complex-valued transmission symbols;
  a demultiplexer for generating parallel output symbols from the complex-valued transmission symbols;
  an adaptive inverse discrete wavelet packet transform ("IDWPT") component for receiving the parallel output symbols and generating an orthogonal multiplexed complex symbol stream, wherein the IDWPT uses a pruned filter bank to avoid signal impediments;
  a pulse shaping component that uses a wavelet scaling function to generate shaped pulses from the orthogonal multiplexed complex symbol stream; and
  a signal processing component for generating the radio frequency signal from the shaped pulses; and
 the receiver for receiving the radio frequency signal from the transmitter and an undesired signal component, the receiver including:
  a receiver pulse shaping component for generating a matched filter output from an input derived from the radio frequency signal and the undesired signal component, wherein the receiver pulse shaping component is matched to the pulse shaping component associated with the transmitter;
  a decimator for selecting one sample per symbol from the matched filter output;
  a symbol synchronization component for determining a sampling instant for the decimator, wherein the symbol synchronization component uses maximum likelihood decision directed ("MLDD") synchronization that is pulse shape independent and non-data aided;
  an adaptive discrete wavelet packet transform ("DWPT") component for generating parallel received symbols from the selected samples, wherein the DWPT uses a pruned filter bank associated with the DWPT that matches the pruned filter bank associated with the IDWPT and the pruned filter bank associated with the DWPT uses filters that match filters associated with the IDWPT;
  a multiplexer for generating a serial symbol stream from the parallel received symbols;
  an interference excision component for analyzing the serial symbol stream to minimize effects of the undesired signal component and generating a received symbol stream;
  an inverse permutation component for depermutating the received symbol stream, the inverse permutation component using an inverse of a permutation used by the permutation component; and
  an FEC decoder for decoding the depermutated symbols into output symbols.

2. The system of claim 1, further comprising:
 a supersymbol tuning block for receiving information about signal impediments, using the signal impediment information for determining a partition that avoids the signal impediments, and communicating the partition to the IDWPT and the DWPT.

3. The system of claim 2, wherein the supersymbol tuning block is associated with the transmitter.

4. The system of claim 2, wherein the supersymbol tuning block is associated with the receiver.

5. The system of claim 1, wherein the permutation component is a block interleaver.

6. The system of claim 1, wherein the FEC encoder implements Circular Simplex Turbo Block Coding FEC.

7. The method of claim 1, wherein the wavelet scaling function is a Square Root Raised Cosine wavelet scaling function.

8. The method of claim 1, wherein the wavelet scaling function is a Modified Gaussian wavelet scaling function.

9. A method for transmitting and receiving radio frequency signals, comprising:
 transmitting a radio frequency signal to a receiver by:
  adaptively pruning a filter bank associated with an inverse discrete wavelet packet transform ("IDWPT") component to avoid signal impediments;
  encoding input symbols using forward error correction ("FEC");
  permutating the encoded symbols;
  mapping the permutated encoded symbols into complex-valued transmission symbols;
  generating parallel output symbols from the complex-valued transmission symbols;
  generating an orthogonal multiplexed complex symbol stream from the parallel output symbols using the IDWPT;

applying a pulse shaping function that uses a wavelet scaling function to the orthogonal multiplexed complex symbol stream to generate shaped pulses; and transmitting the radio frequency signal derived from the shaped pulses to the receiver; and receiving the radio frequency signal from a transmitter and an undesired signal component by:

adaptively pruning a filter bank associated with a discrete wavelet packet transform ("DWPT") component that uses filters that match filters associated with the IDWPT so that the pruned filter bank associated with the DWPT matches the pruned filter bank associated with the IDWPT associated with the transmitter;

applying a matched pulse shaping function to an input derived from the radio frequency signal and the undesired signal component to generate a matched filter output;

using a symbol timing estimate to select one sample per symbol from the matched filter output;

generating parallel received symbols from the selected samples using the DWPT;

combining the parallel received symbols into a serial symbol stream;

excising effects of the undesired signal component from the serial symbol stream;

depermutating the excised symbol stream; and decoding the depermutated symbol stream to obtain detected symbols.

10. The method of claim 9, further comprising:
detecting information regarding signal impediments;
using the information to determine a partition to avoid the signal impediments; and
communicating the partition to the IDWPT and the DWPT.

11. The method of claim 9, wherein permutating the encoded symbols comprises interleaving the encoded symbols.

12. The method of claim 9, wherein the FEC is Circular Simplex Turbo Block Coding.

13. The method of claim 9, further comprising:
determining the symbol timing estimate by
dividing the detected symbols into a second set of parallel symbols;
generating a second orthogonal multiplexed complex symbol stream by inputting the second set of parallel symbols into an inverse discrete wavelet packet transform ("IDWPT") component associated with the receiver that uses a filter bank matched to the filter bank associated with the DWPT;
applying a pulse shaping function to the second orthogonal multiplexed complex symbol stream to create a reconstituted symbol stream;
delaying the matched filter output to create a second matched filter output; and
correlating the second matched filter output and the reconstituted symbol stream using a feed forward, open-loop process to generate the symbol timing estimate.

14. The method of claim 9, wherein the wavelet scaling function is a Square Root Raised Cosine wavelet scaling function.

15. The method of claim 9, wherein the wavelet scaling function is a Modified Gaussian wavelet scaling function.

16. The method of claim 9, wherein generating parallel output symbols from the complex-valued transmission symbols comprises:

applying a pseudonoise code to the complex-valued transmission symbols; and
determining a rate for each of the parallel output symbols based upon the filter bank associated with the IDWPT.

17. The method of claim 9, wherein the parallel received symbols are multirate and wherein combining the parallel received symbols into a serial symbol stream comprises:
removing a pseudonoise code from the parallel received symbols to generate multirate non-coded parallel received symbols;
generating a plurality of summer inputs from the non-coded parallel received symbols, wherein the generation of the summer inputs accommodates the multirate non-coded parallel received symbols; and
summing the summer inputs to generate the serial symbol stream.

18. A method for symbol synchronization, comprising:
calculating a symbol timing estimate using maximum likelihood decision directed ("MLDD") synchronization that is pulse shape independent and non-data aided;
selecting one sample per symbol from a matched filter output using the symbol timing estimate;
generating parallel symbols by inputting the selected samples into a discrete wavelet packet transform ("DWPT") component having an adaptively pruned filter bank;
combining the parallel symbols into a serial complex symbol stream; and
detecting symbols from the serial complex symbol stream.

19. The method of claim 18, wherein calculating a symbol timing estimate comprises:
receiving the detected symbols;
dividing the detected symbols into a second set of parallel symbols;
generating an orthogonal multiplexed complex symbol stream by inputting the second set of parallel symbols into an inverse discrete wavelet packet transform ("IDWPT") component that uses a filter bank matched to the adaptively pruned filter bank associated with the DWPT;
applying a pulse shaping function to the orthogonal multiplexed complex symbol stream to create a reconstituted symbol stream;
delaying the matched filter output to create second matched filter output; and
correlating the second matched filter output and the reconstituted symbol stream using a feed forward, open-loop process to generate the symbol timing estimate.

20. The method of claim 19, wherein the pulse shaping function is a Square Root Raised Cosine wavelet scaling function.

21. The method of claim 19, wherein the pulse shaping function is a Modified Gaussian wavelet scaling function.

22. The method of claim 19, further comprising:
sharing the IDWPT component on a half-duplex link for transmission and symbol synchronization.

23. The method of claim 18, wherein calculating the symbol timing estimate is independent of the pruning of the filter bank associated with the DWPT.

24. The method of claim 18, wherein the matched filter output is generated by sampling input wavelet packet modulation ("WPM") pulses and applying a pulse shaping function matched to a wavelet scaling function used by a transmitter.

25. The method of claim 18, wherein the matched filter output is generated by applying a pulse shaping function matched to a wavelet scaling function used by a transmitter to input wavelet packet modulation ("WPM") pulses and sampling the shaped WPM pulses.

26. A method for symbol synchronization comprising:
receiving detected symbols;
dividing the detected symbols into parallel symbols;
generating an orthogonal multiplexed complex symbol stream by inputting the parallel symbols into an adaptive inverse discrete wavelet packet transform ("IDWPT") component, wherein a filter bank associated with the IDWPT is matched to a filter bank associated with an adaptive IDWPT component associated with a transmitter;
applying a pulse shaping function to the orthogonal multiplexed complex symbol stream to create a reconstituted symbol stream;
delaying a matched filter output to create a second matched filter output;
correlating the second matched filter output and the reconstituted symbol stream using a feed forward, open-loop process to generate a symbol timing estimate; and
using the symbol timing estimate to select one sample per symbol from the matched filter output.

27. The method of claim 26, wherein the filter bank associated with the adaptive IDWPT component is pruned to avoid known signal impediments.

28. The method of claim 26, wherein the pulse shaping function is a Square Root Raised Cosine wavelet scaling function.

29. The method of claim 26, wherein the pulse shaping function is a Modified Gaussian wavelet scaling function.

30. A wireless communication system, comprising:
a transmitter for transmitting a radio frequency signal to a receiver, the transmitter including:
a forward error correction ("FEC") encoder for encoding input symbols to generate encoded symbols;
a permutation component for permutating the encoded symbols;
a complex symbol mapper for mapping the permutated symbols into complex-valued transmission symbols;
a pseudonoise code applicator and multiplexer component for applying a pseudonoise code and for generating parallel output symbols from the complex-valued transmission symbols, each of the parallel output symbols having a rate determined by a pruned filter bank associated with an adaptive inverse discrete wavelet packet transform ("IDWPT") component;
the adaptive IDWPT component for receiving the parallel output symbols and generating an orthogonal multiplexed complex symbol stream, wherein the IDWPT uses the pruned filter bank associated with the IDWPT to avoid signal impediments;
a pulse shaping component that uses a wavelet scaling function to generate shaped pulses from the orthogonal multiplexed complex symbol stream; and
a signal processing component for generating the radio frequency signal from the shaped pulses; and
the receiver for receiving the radio frequency signal from the transmitter and an undesired signal component, the receiver including:
a receiver pulse shaping component for generating a matched filter output from an input derived from the radio frequency signal and the undesired signal component, wherein the receiver pulse shaping component is matched to the pulse shaping component associated with the transmitter;
a decimator for selecting one sample per symbol from the matched filter output;
a symbol synchronization component for determining a sampling instant for the decimator, wherein the symbol synchronization component uses maximum likelihood decision directed ("MLDD") synchronization that is pulse shape independent and non-data aided;
an adaptive discrete wavelet packet transform ("DWPT") component for generating parallel received symbols from the selected samples, wherein the DWPT uses a pruned filter bank associated with the DWPT that matches the pruned filter bank associated with the IDWPT and the pruned filter bank associated with the DWPT uses filters that match filters associated with the IDWPT;
a pseudonoise code correlator and demultiplexer component for removing the pseudonoise code from the parallel received symbols and generating parallel correlated received symbols, wherein the pseudonoise code correlator and demultiplexer component accommodates multirate parallel received symbols;
a summer for generating a serial symbol stream from the parallel correlated received symbols;
an interference excision component for analyzing the serial symbol stream to minimize effects of the undesired signal component and generating a received symbol stream;
an inverse permutation component for depermutating the received symbol stream, the inverse permutation component using an inverse of a permutation used by the permutation component; and
an FEC decoder for decoding the depermuted symbols into output symbols.

31. The system of claim 30, further comprising:
a supersymbol tuning block for receiving information about signal impediments, using the signal impediment information for determining a partition that avoids the signal impediments, and communicating the partition to the IDWPT and the DWPT.

32. The system of claim 31, wherein the supersymbol tuning block is associated with the transmitter.

33. The system of claim 31, wherein the supersymbol tuning block is associated with the receiver.

34. The system of claim 30, wherein the permutation component is a block interleaver.

35. The system of claim 30, wherein the FEC encoder implements Circular Simplex Turbo Block Coding FEC.

36. The system of claim 30, wherein the wavelet scaling function is a Square Root Raised Cosine wavelet scaling function.

37. The method of claim 30, wherein the wavelet scaling function is a Modified Gaussian wavelet scaling function.

* * * * *

UNITED STATES PATENT AND TRADEMARK OFFICE
CERTIFICATE OF CORRECTION

PATENT NO.       : 7,206,359 B2
APPLICATION NO.  : 10/400834
DATED            : April 17, 2007
INVENTOR(S)      : Erik H. Kjeldsen and Alan R. Lindsey It is certified that error appears in the above-identified patent and that said Letters Patent is hereby corrected as shown below:

On the title page item (56), add the following OTHER PUBLICATION
--H. Meyr, M. Moeneclaey, and S. A. Fechtel, *Digital Communication Receivers: Synchronization, Channel Estimation, and Signal Processing,* New York: John Wiley & Sons, 1998, pp. 505-532--

Column 8, line 20
Delete "ß ≦ 3/5" and insert --$\beta \leq 3/5$-- in place thereof Column 8, line 49
Delete "L≧M" and insert --$L \geq M$-- in place thereof Column 11, line 10
Delete "$\theta[n] = n^2\pi/N$, where N is the sequence length and $0 \leq n < N$"

and insert

Figure 11B:
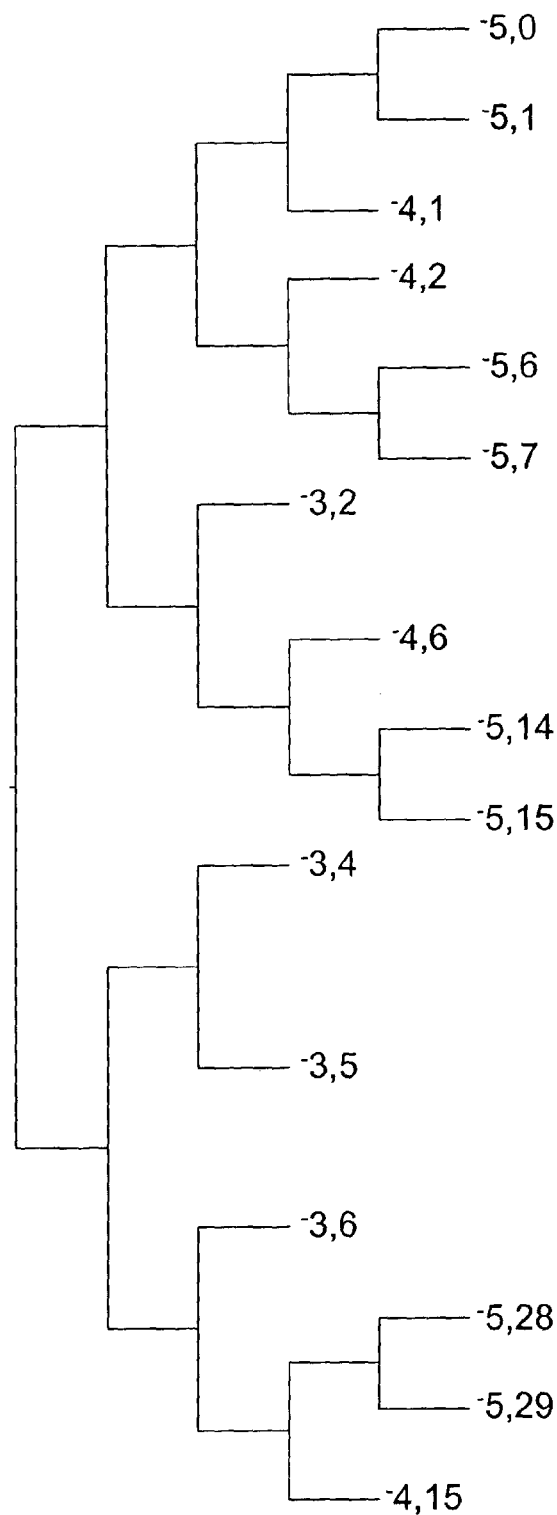
FIG. 11B is a block diagram illustrating a filter tree corresponding to the mapping of FIG. 11A in accordance with an embodiment of the invention.

--$\theta[n] = n^2\pi/N$, where N is the sequence length and $0 \leq n < N$-- in place thereof Column 13, line 26
Delete "FIG. 1A" and insert --FIG. 11A-- in place thereof Column 13, line 26
Delete "FIG. 1B" and insert --FIG. 11B-- in place thereof Column 16, line 1
Delete "gi" and insert --$g_i$-- in place thereof Column 16, line 3
Delete "a" and insert --â-- in place thereof Column 18, line 21
Delete "$A_L$" and insert --$A_L$-- in place thereof Column 18, line 34
Delete "$|u| \leqq 0.5.$" and insert --$|u| \leq 0.5.$-- in place thereof

UNITED STATES PATENT AND TRADEMARK OFFICE
CERTIFICATE OF CORRECTION

PATENT NO. : 7,206,359 B2
APPLICATION NO. : 10/400834
DATED : April 17, 2007
INVENTOR(S) : Erik H. Kjeldsen and Alan R. Lindsey It is certified that error appears in the above-identified patent and that said Letters Patent is hereby corrected as shown below:

Column 19, line 8
Delete " = the energy in the wavelet packet function associated with the $j^{th}$ frequency bin in the data bandwidth"

and insert -- $E'_j = \dfrac{2^j E}{T}$ = the energy in the wavelet packet function associated with the $j^{th}$ frequency bin in the data bandwidth-- in place thereof

Signed and Sealed this

Fourteenth Day of August, 2007

JON W. DUDAS
*Director of the United States Patent and Trademark Office*